(12) United States Patent
Cartwright

(10) Patent No.: US 10,346,853 B2
(45) Date of Patent: Jul. 9, 2019

(54) COMPUTING ENVIRONMENT TRANSACTION SYSTEM TO TRANSACT COMPUTING ENVIRONMENT CIRCUMVENTIONS

(75) Inventor: Shawn Cartwright, Philadelphia, PA (US)

(73) Assignee: Gametek LLC, Newport Beach, CA (US)

( * ) Notice: Subject to any disclaimer, the term of this patent is extended or adjusted under 35 U.S.C. 154(b) by 1679 days.

(21) Appl. No.: 10/418,815

(22) Filed: Apr. 18, 2003

(65) Prior Publication Data

US 2004/0024641 A1 Feb. 5, 2004

Related U.S. Application Data

(63) Continuation-in-part of application No. 09/676,448, filed on Sep. 29, 2000, now Pat. No. 7,076,445.
(Continued)

(51) Int. Cl.
| | | |
|---|---|---|
| *G06Q 30/00* | (2012.01) | |
| *G06Q 30/02* | (2012.01) | |
| *G06Q 30/06* | (2012.01) | |

(52) U.S. Cl.
CPC ......... *G06Q 30/02* (2013.01); *G06Q 30/0209* (2013.01); *G06Q 30/0211* (2013.01);
(Continued)

(58) Field of Classification Search
CPC .......... G06Q 30/0209; G06Q 30/0211; G06Q 30/0222; G06Q 30/0239
(Continued)

(56) References Cited

U.S. PATENT DOCUMENTS

| | | |
|---|---|---|
| 4,582,324 A | 4/1986 | Koza et al. |
| 4,738,451 A | 4/1988 | Logg |

(Continued)

FOREIGN PATENT DOCUMENTS

| | | |
|---|---|---|
| AU | 718243 B3 | 4/2000 |
| EP | 0 780 771 A2 | 6/1997 |

(Continued)

OTHER PUBLICATIONS

"America's first coupon: 1895." Joint Industry Coupon Committee. Coupons: A Complete Guide. 1998, p. iv.*
(Continued)

*Primary Examiner* — Michael Bekerman
(74) *Attorney, Agent, or Firm* — Amin, Turocy & Watson, LLP

(57) ABSTRACT

A system and methods allowing the creation, integration, and transaction of rule circumventions and/or interactive advertisements in computing environments is provided. In an illustrative implementation, the present invention comprises a core transaction server, a multimedia transaction server, and browser application. A computing environment cooperates with the core transaction server to obtain data representative of computing environment rule circumventions for integration within the computing environment as well as computing environment circumvention transaction information. The core transaction server cooperates with the multimedia transaction server to obtain data representative of the desired computing environment rule circumvention and with the browser application to obtain inputs from computing environment to establish accounts for use when transacting computing environment rule circumvention transactions.

6 Claims, 22 Drawing Sheets

Related U.S. Application Data

(60) Provisional application No. 60/212,749, filed on Jun. 20, 2000.

(52) U.S. Cl.
CPC ..... *G06Q 30/0222* (2013.01); *G06Q 30/0239* (2013.01); *G06Q 30/0241* (2013.01); *G06Q 30/0269* (2013.01); *G06Q 30/0274* (2013.01); *G06Q 30/0275* (2013.01); *G06Q 30/0277* (2013.01); *G06Q 30/0601* (2013.01)

(58) Field of Classification Search
USPC .................... 705/14.12, 14.13, 14.23, 14.39
See application file for complete search history.

(56) References Cited

U.S. PATENT DOCUMENTS

| | | |
|---|---|---|
| 4,837,728 A | 6/1989 | Barrie et al. |
| 4,856,787 A | 8/1989 | Itkis |
| 5,166,886 A | 11/1992 | Molnar et al. |
| 5,242,163 A | 9/1993 | Fulton |
| 5,333,868 A | 8/1994 | Goldfarb |
| 5,351,970 A | 10/1994 | Fioretti |
| 5,431,408 A | 7/1995 | Adams |
| 5,497,479 A | 3/1996 | Hornbuckle |
| 5,509,070 A | 4/1996 | Schull |
| 5,560,603 A | 10/1996 | Seelig et al. |
| 5,624,316 A | 4/1997 | Roskowski et al. |
| 5,625,690 A | 4/1997 | Michel et al. |
| 5,654,746 A | 8/1997 | McMullan, Jr. et al. |
| 5,655,961 A | 8/1997 | Acres et al. |
| 5,663,547 A | 9/1997 | Ziamo |
| 5,664,998 A | 9/1997 | Seelig et al. |
| 5,665,952 A | 9/1997 | Ziamo |
| 5,694,546 A | 12/1997 | Reisman |
| 5,697,844 A | 12/1997 | Von Kohorn |
| 5,708,709 A | 1/1998 | Rose |
| 5,710,887 A | 1/1998 | Chelliah et al. |
| 5,715,400 A | 2/1998 | Reimer et al. |
| 5,720,663 A | 2/1998 | Nakatani et al. |
| 5,745,886 A | 4/1998 | Rosen |
| 5,752,238 A | 5/1998 | Dedrick |
| 5,761,648 A | 6/1998 | Golden et al. |
| 5,765,143 A | 6/1998 | Sheldon et al. |
| 5,769,716 A | 6/1998 | Saffari et al. |
| 5,779,544 A | 7/1998 | Seelig et al. |
| 5,794,210 A | 8/1998 | Goldhaber et al. |
| 5,794,217 A | 8/1998 | Allen |
| 5,809,482 A | 9/1998 | Strisower |
| 5,819,092 A | 10/1998 | Ferguson |
| 5,823,874 A | 10/1998 | Adams |
| 5,825,883 A | 10/1998 | Archibald et al. |
| 5,835,603 A | 11/1998 | Coutts et al. |
| 5,845,260 A | 12/1998 | Nakano et al. |
| 5,845,265 A | 12/1998 | Woolston |
| 5,848,932 A | 12/1998 | Adams |
| 5,855,006 A | 12/1998 | Huemoeller et al. |
| 5,855,008 A | 12/1998 | Goldhaber et al. |
| 5,855,515 A | 1/1999 | Pease et al. |
| 5,873,068 A | 2/1999 | Beaumont et al. |
| 5,875,437 A | 2/1999 | Atkins |
| 5,876,284 A | 3/1999 | Acres et al. |
| 5,878,139 A | 3/1999 | Rosen |
| 5,882,261 A | 3/1999 | Adams |
| 5,884,029 A | 3/1999 | Brush, II et al. |
| 5,890,135 A | 3/1999 | Powell |
| 5,894,320 A | 4/1999 | Vancelette |
| 5,895,454 A | 4/1999 | Harrignton |
| 5,903,652 A | 5/1999 | Mital |
| 5,903,874 A | 5/1999 | Leonard et al. |
| 5,907,275 A | 5/1999 | Battistini et al. |
| 5,907,617 A | 5/1999 | Ronning |
| 5,907,831 A | 5/1999 | Lotvin et al. |
| 5,915,019 A | 6/1999 | Ginter et al. |
| 5,915,243 A | 6/1999 | Smolen |
| 5,916,024 A | 6/1999 | Sasaki et al. |
| 5,917,912 A | 6/1999 | Ginter et al. |
| 5,918,213 A | 6/1999 | Bernard et al. |
| 5,930,762 A | 7/1999 | Masch |
| 5,930,767 A | 7/1999 | Reber et al. |
| 5,933,811 A | 8/1999 | Angles et al. |
| 5,940,805 A | 8/1999 | Kopp |
| 5,948,040 A | 9/1999 | DeLorme |
| 5,949,876 A | 9/1999 | Ginter et al. |
| 5,956,038 A | 9/1999 | Rekimoto |
| 5,960,406 A | 9/1999 | Rasansky et al. |
| 5,963,914 A | 10/1999 | Skinner et al. |
| 5,964,660 A | 10/1999 | James et al. |
| 5,970,143 A | 10/1999 | Schneier et al. |
| 5,970,470 A | 10/1999 | Walker et al. |
| 5,970,479 A | 10/1999 | Shepherd |
| 5,974,454 A | 10/1999 | Apfel et al. |
| 5,980,384 A | 11/1999 | Barrie |
| 5,982,891 A | 11/1999 | Ginter et al. |
| 5,983,196 A | 11/1999 | Wendkos |
| 5,987,430 A | 11/1999 | Home et al. |
| 5,991,747 A | 11/1999 | Tomoyuki et al. |
| 6,003,013 A | 12/1999 | Boushy et al. |
| 6,003,014 A | 12/1999 | Lee et al. |
| 6,003,021 A | 12/1999 | Zadik et al. |
| 6,007,426 A | 12/1999 | Kelly et al. |
| 6,009,410 A | 12/1999 | LeMole et al. |
| 6,012,045 A | 1/2000 | Barzilai et al. |
| 6,012,982 A | 1/2000 | Piechowiak et al. |
| 6,014,651 A | 1/2000 | Crawford |
| 6,018,717 A | 1/2000 | Lee et al. |
| 6,018,720 A | 1/2000 | Fujimoto |
| 6,018,724 A | 1/2000 | Arent |
| 6,024,572 A | 2/2000 | Weyer |
| 6,024,643 A | 2/2000 | Begis |
| 6,026,381 A | 2/2000 | Barton |
| 6,036,601 A | 3/2000 | Heckel |
| 6,039,648 A | 3/2000 | Guinn et al. |
| 6,044,360 A | 3/2000 | Picciallo |
| 6,048,269 A | 4/2000 | Burns et al. |
| 6,049,778 A | 4/2000 | Walker et al. |
| 6,049,779 A | 4/2000 | Berkson |
| 6,055,518 A | 4/2000 | Franklin et al. |
| 6,058,379 A | 5/2000 | Odom et al. |
| 6,061,660 A | 5/2000 | Eggleston et al. |
| 6,067,532 A | 5/2000 | Gebb |
| 6,067,582 A | 5/2000 | Smith et al. |
| 6,071,191 A | 6/2000 | Takeda et al. |
| 6,073,124 A | 6/2000 | Krishnan et al. |
| 6,078,901 A | 6/2000 | Ching |
| 6,078,906 A | 6/2000 | Huberman |
| 6,081,790 A | 6/2000 | Rosen |
| 6,085,176 A | 7/2000 | Woolston |
| 6,085,178 A | 7/2000 | Bigus et al. |
| 6,089,976 A | 7/2000 | Schneider et al. |
| 6,089,978 A | 7/2000 | Adams |
| 6,092,052 A | 7/2000 | Ziamo |
| 6,108,644 A | 8/2000 | Goldschlag et al. |
| 6,112,181 A | 8/2000 | Shear et al. |
| 6,119,096 A | 9/2000 | Mann et al. |
| 6,119,099 A | 9/2000 | Walker et al. |
| 6,119,229 A | 9/2000 | Martinez et al. |
| 6,120,031 A | 9/2000 | Adams |
| 6,128,599 A * | 10/2000 | Walker et al. ............ 705/14.27 |
| 6,128,601 A | 10/2000 | Home et al. |
| 6,131,085 A | 10/2000 | Rossides |
| 6,134,536 A | 10/2000 | Shepherd |
| 6,139,433 A | 10/2000 | Miyamoto et al. |
| 6,139,434 A | 10/2000 | Miyamoto et al. |
| 6,141,010 A | 10/2000 | Hoyle |
| 6,144,946 A | 11/2000 | Iwamura |
| 6,146,273 A | 11/2000 | Olsen |
| 6,152,824 A | 11/2000 | Rothschild et al. |
| 6,154,731 A | 11/2000 | Monks et al. |
| 6,155,926 A | 12/2000 | Miyamoto et al. |
| 6,157,377 A | 12/2000 | Shah-Nazaroff et al. |
| 6,162,122 A | 12/2000 | Acres et al. |
| 6,163,772 A | 12/2000 | Kramer et al. |

(56) References Cited

U.S. PATENT DOCUMENTS

| | | |
|---|---|---|
| 6,165,071 A | 12/2000 | Weiss |
| 6,169,976 B1 | 1/2001 | Colosso |
| 6,178,407 B1 | 1/2001 | Lotvin et al. |
| 6,178,409 B1 | 1/2001 | Weber et al. |
| 6,179,713 B1 | 1/2001 | James et al. |
| 6,190,257 B1 | 2/2001 | Takeda et al. |
| 6,193,607 B1 | 2/2001 | Kay |
| 6,199,046 B1 | 3/2001 | Heinzle et al. |
| 6,202,051 B1 | 3/2001 | Woolston |
| 6,205,436 B1 | 3/2001 | Rosen |
| 6,208,974 B1 | 3/2001 | Campbell et al. |
| 6,208,976 B1 | 3/2001 | Kinebuchi et al. |
| 6,210,275 B1 | 4/2001 | Olsen |
| 6,216,110 B1 | 4/2001 | Silverberg |
| 6,216,111 B1 | 4/2001 | Walker et al. |
| 6,223,165 B1 | 4/2001 | Lauffer |
| 6,226,618 B1 | 5/2001 | Downs et al. |
| 6,233,564 B1 | 5/2001 | Schulze, Jr. |
| 6,233,566 B1 | 5/2001 | LeVine et al. |
| 6,233,567 B1 | 5/2001 | Cohen |
| 6,234,897 B1 | 5/2001 | Frohm et al. |
| 6,236,971 B1 | 5/2001 | Stefik et al. |
| 6,236,977 B1 | 5/2001 | Verba et al. |
| 6,236,979 B1 | 5/2001 | Kawabata |
| 6,240,396 B1 | 5/2001 | Walker et al. |
| 6,240,397 B1 | 5/2001 | Sachs |
| 6,241,524 B1 | 6/2001 | Aoshima et al. |
| 6,244,959 B1 | 6/2001 | Miyamoto et al. |
| 6,253,193 B1 | 6/2001 | Ginter et al. |
| 6,260,019 B1 | 7/2001 | Courts |
| 6,263,313 B1 | 7/2001 | Milsted et al. |
| 6,266,647 B1 | 7/2001 | Fernandez |
| 6,266,651 B1 | 7/2001 | Woolston |
| 6,267,669 B1 | 7/2001 | Luciano, Jr. et al. |
| 6,267,673 B1 | 7/2001 | Miyamoto et al. |
| 6,270,411 B1 | 8/2001 | Gura et al. |
| 6,273,820 B1 | 8/2001 | Haste, III |
| 6,278,980 B1 | 8/2001 | Wendkos |
| 6,283,857 B1 | 9/2001 | Miyamoto et al. |
| 6,302,790 B1 | 10/2001 | Brossard |
| 6,308,159 B1 | 10/2001 | Strohl |
| 6,314,409 B2 | 11/2001 | Schneck et al. |
| 6,317,718 B1 | 11/2001 | Fano |
| 6,321,212 B1 | 11/2001 | Lange |
| 6,324,525 B1 | 11/2001 | Kramer et al. |
| 6,327,569 B1 | 12/2001 | Reep |
| 6,327,570 B1 | 12/2001 | Stevens |
| 6,327,573 B1 | 12/2001 | Walker et al. |
| 6,331,146 B1 | 12/2001 | Miyamoto et al. |
| 6,334,118 B1 | 12/2001 | Benson |
| 6,336,095 B1 | 1/2002 | Rosen |
| 6,339,765 B1 | 1/2002 | Maher |
| 6,343,284 B1 | 1/2002 | Ishikawa et al. |
| 6,345,256 B1 | 2/2002 | Milsted et al. |
| 6,363,363 B1 | 3/2002 | Haller et al. |
| 6,363,364 B1 | 3/2002 | Nel |
| 6,374,228 B1 | 4/2002 | Litwin |
| 6,383,079 B1 | 5/2002 | Takeda et al. |
| 6,385,590 B1 | 5/2002 | Levine |
| 6,385,592 B1 | 5/2002 | Angles et al. |
| 6,389,402 B1 | 5/2002 | Ginter et al. |
| 6,389,403 B1 | 5/2002 | Dorak, Jr. |
| 6,393,409 B2 | 5/2002 | Young et al. |
| 6,394,905 B1 | 5/2002 | Takeda et al. |
| 6,406,369 B1 | 6/2002 | Baerlocher et al. |
| 6,418,417 B1 | 7/2002 | Corby et al. |
| 6,418,421 B1 | 7/2002 | Hurtado et al. |
| 6,427,140 B1 | 7/2002 | Ginter et al. |
| 6,446,045 B1 | 9/2002 | Stone et al. |
| 6,453,299 B1 | 9/2002 | Wendkos |
| 6,454,652 B2 | 9/2002 | Miyamoto et al. |
| 6,473,739 B1 | 10/2002 | Showghi et al. |
| 6,473,740 B2 | 10/2002 | Cockrill et al. |
| 6,476,830 B1 | 11/2002 | Farmer et al. |
| 6,484,148 B1 | 11/2002 | Boyd |
| 6,493,682 B1 | 12/2002 | Horrigan et al. |
| 6,496,808 B1 | 12/2002 | Aiello et al. |
| 6,505,174 B1 | 1/2003 | Keiser et al. |
| 6,519,571 B1 | 2/2003 | Guheen et al. |
| 6,523,010 B2 | 2/2003 | Lauffer |
| 6,532,448 B1 | 3/2003 | Higginson et al. |
| 6,546,372 B1 | 4/2003 | Lauffer |
| 6,549,889 B2 | 4/2003 | Lauffer |
| 6,571,216 B1 | 5/2003 | Garg et al. |
| 6,571,221 B1 | 5/2003 | Stewart et al. |
| 6,574,609 B1 | 6/2003 | Downs et al. |
| 6,578,008 B1 | 6/2003 | Chacker |
| 6,581,039 B2 | 6/2003 | Marpe et al. |
| 6,581,044 B1 | 6/2003 | Alur |
| 6,587,835 B1 | 7/2003 | Treyz et al. |
| 6,587,837 B1 | 7/2003 | Spagna et al. |
| 6,591,250 B1 | 7/2003 | Johnson et al. |
| 6,594,640 B1 | 7/2003 | Postrel |
| 6,598,024 B1 | 7/2003 | Walker et al. |
| 6,609,113 B1 | 8/2003 | O'Leary et al. |
| 6,611,812 B2 | 8/2003 | Hurtado et al. |
| 6,616,533 B1 | 9/2003 | Rashkovskiy |
| 6,629,081 B1 | 9/2003 | Cornelius et al. |
| 6,631,359 B1 | 10/2003 | Braitberg et al. |
| 6,671,675 B2 | 12/2003 | Iwamura |
| 6,675,152 B1 | 1/2004 | Prasad et al. |
| 6,738,750 B2 | 5/2004 | Stone et al. |
| 6,741,967 B1 | 5/2004 | Wu et al. |
| 6,775,655 B1 | 8/2004 | Peinado et al. |
| 6,785,659 B1 | 8/2004 | Landsman et al. |
| 6,801,899 B2 | 10/2004 | Lauffer |
| 6,807,534 B1 | 10/2004 | Erickson |
| 6,820,061 B2 | 11/2004 | Postrel |
| 6,820,063 B1 | 11/2004 | England et al. |
| 6,829,586 B2 | 12/2004 | Postrel |
| 6,829,587 B2 | 12/2004 | Stone et al. |
| 6,829,595 B2 | 12/2004 | Justice |
| 6,834,269 B1 | 12/2004 | Bueche |
| 6,834,272 B1 | 12/2004 | Naor et al. |
| 6,836,765 B1 | 12/2004 | Sussman |
| 6,839,680 B1 | 1/2005 | Liu et al. |
| 6,842,737 B1 | 1/2005 | Stiles et al. |
| 6,842,739 B2 | 1/2005 | Postrel |
| 6,842,741 B1 | 1/2005 | Fujimura |
| 6,847,938 B1 | 1/2005 | Moore |
| 6,847,950 B1 | 1/2005 | Kamibayashi et al. |
| 6,850,901 B1 | 2/2005 | Hunter et al. |
| 6,850,909 B1 | 2/2005 | Aiello et al. |
| 6,856,966 B1 | 2/2005 | Fujimoto |
| 6,856,967 B1 | 2/2005 | Woolston et al. |
| 6,856,968 B2 | 2/2005 | Cooley et al. |
| 6,856,975 B1 | 2/2005 | Inglis |
| 6,859,791 B1 | 2/2005 | Spagna et al. |
| 6,865,551 B1 | 3/2005 | Stefik et al. |
| 6,868,394 B1 | 3/2005 | Mele |
| 6,868,403 B1 | 3/2005 | Wiser et al. |
| 6,871,192 B2 | 3/2005 | Fontana et al. |
| 6,873,969 B2 | 3/2005 | Stone et al. |
| 6,873,970 B2 | 3/2005 | Showghi et al. |
| 6,879,965 B2 | 4/2005 | Fung et al. |
| 6,882,985 B1 | 4/2005 | Kay et al. |
| 6,889,209 B1 | 5/2005 | Rabin et al. |
| 6,892,180 B1 | 5/2005 | Pointeau et al. |
| 6,892,182 B1 | 5/2005 | Rowe et al. |
| 6,895,381 B1 | 5/2005 | Selby |
| 6,895,392 B2 | 5/2005 | Stefik et al. |
| 6,895,394 B1 | 5/2005 | Kremer et al. |
| 6,898,576 B2 | 5/2005 | Stefik et al. |
| 6,901,375 B2 | 5/2005 | Fernandez |
| 6,901,383 B1 | 5/2005 | Ricketts et al. |
| 6,904,410 B1 | 6/2005 | Weiss et al. |
| 6,907,400 B1 | 6/2005 | Mastsko et al. |
| 6,907,405 B2 | 6/2005 | Brett |
| 6,910,022 B2 | 6/2005 | Stefik et al. |
| 6,912,503 B1 | 6/2005 | Quarendon et al. |
| 6,912,510 B1 | 6/2005 | Shepherd |
| 6,915,269 B1 | 7/2005 | Shapiro et al. |
| 6,915,272 B1 | 7/2005 | Zilliacus et al. |
| 6,920,431 B2 | 7/2005 | Showghi et al. |

(56) References Cited

U.S. PATENT DOCUMENTS

| | | |
|---|---|---|
| 6,920,436 B2 | 7/2005 | Stefik et al. |
| 6,922,720 B2 | 7/2005 | Cianciarulo et al. |
| 6,925,448 B2 | 8/2005 | Stefik et al. |
| 6,925,469 B2 | 8/2005 | Headings et al. |
| 6,928,413 B1 | 8/2005 | Pulitzer |
| 6,928,414 B1 | 8/2005 | Kim |
| 6,928,419 B2 | 8/2005 | Stefik et al. |
| 6,928,420 B1 | 8/2005 | Kurihara et al. |
| 6,934,692 B1 | 8/2005 | Duncan |
| 6,934,693 B2 | 8/2005 | Stefik et al. |
| 6,937,993 B1 | 8/2005 | Gabbita et al. |
| 6,937,997 B1 | 8/2005 | Parulski |
| 6,938,021 B2 | 8/2005 | Shear et al. |
| 6,938,244 B1 | 8/2005 | Perlin et al. |
| 6,941,270 B1 | 9/2005 | Hannula |
| 6,941,353 B1 | 9/2005 | Lane |
| 6,942,569 B2 | 9/2005 | Petracca |
| 6,944,596 B1 | 9/2005 | Gray et al. |
| 6,944,600 B2 | 9/2005 | Stefik et al. |
| 6,944,632 B2 | 9/2005 | Stern |
| 7,749,089 B1 | 7/2010 | Briggs et al. |
| 2001/0044339 A1 | 11/2001 | Cordero et al. |
| 2001/0046896 A1 | 11/2001 | Miyamoto et al. |
| 2002/0082065 A1 | 6/2002 | Fogel et al. |
| 2002/0082077 A1 | 6/2002 | Johnson |
| 2002/0115486 A1 | 8/2002 | Miyamoto et al. |
| 2002/0193162 A1 | 12/2002 | Walker |
| 2003/0078102 A1 | 4/2003 | Katsunori et al. |
| 2003/0104854 A1 | 6/2003 | Cannon |
| 2003/0104860 A1 | 6/2003 | Cannon et al. |
| 2003/0114218 A1 | 6/2003 | McClintic |
| 2003/0114219 A1 | 6/2003 | McClintic |
| 2003/0114220 A1 | 6/2003 | McClintic |
| 2003/0119573 A1 | 6/2003 | McClintic |
| 2003/0119576 A1 | 6/2003 | McClintic |
| 2003/0119581 A1 | 6/2003 | Cannon et al. |
| 2003/0125100 A1 | 7/2003 | Cannon |
| 2003/0125103 A1 | 7/2003 | Tessmer |
| 2003/0125107 A1 | 7/2003 | Cannon |
| 2004/0053690 A1 | 3/2004 | Fogel |
| 2004/0148221 A1 | 7/2004 | Chu |
| 2004/0177007 A1 | 9/2004 | Van Luchene |
| 2004/0181456 A1 | 9/2004 | Matsumori |
| 2005/0045025 A1 | 3/2005 | Wells et al. |
| 2005/0080727 A1 | 4/2005 | Postrel |
| 2005/0080911 A1 | 4/2005 | Stiers et al. |
| 2005/0083877 A1 | 4/2005 | Zilliacus et al. |
| 2005/0085294 A1 | 4/2005 | Walker et al. |
| 2005/0085295 A1 | 4/2005 | Walker et al. |
| 2005/0086126 A1 | 4/2005 | Patterson |
| 2005/0086585 A1 | 4/2005 | Robert et al. |
| 2005/0091133 A1 | 4/2005 | Balllman |
| 2005/0092839 A1 | 5/2005 | Oram |
| 2005/0096114 A1 | 5/2005 | Cannon et al. |
| 2005/0096116 A1 | 5/2005 | Mindes |
| 2005/0096121 A1 | 5/2005 | Gilliland et al. |
| 2005/0096123 A1 | 5/2005 | Cregan et al. |
| 2005/0096127 A1 | 5/2005 | Dabrowski |
| 2005/0096133 A1 | 5/2005 | Hoefelmeyer et al. |
| 2005/0096134 A1 | 5/2005 | Lippincott |
| 2005/0096841 A1 | 5/2005 | Gedik et al. |
| 2005/0096975 A1 | 5/2005 | Moshe |
| 2005/0102178 A1 | 5/2005 | Phillips et al. |
| 2005/0102188 A1 | 5/2005 | Hutchison et al. |
| 2005/0102199 A1 | 5/2005 | Lee |
| 2005/0102211 A1 | 5/2005 | Freeny, Jr. |
| 2005/0102215 A1 | 5/2005 | Ausubel et al. |
| 2005/0102216 A1 | 5/2005 | Ballman |
| 2005/0102329 A1 | 5/2005 | Jiang et al. |
| 2005/0102374 A1 | 5/2005 | Moragne et al. |
| 2005/0102381 A1 | 5/2005 | Jiang et al. |
| 2005/0102638 A1 | 5/2005 | Jiang et al. |
| 2005/0105731 A1 | 5/2005 | Basquin |
| 2005/0107152 A1 | 5/2005 | McGee et al. |
| 2005/0107155 A1 | 5/2005 | Potts et al. |
| 2005/0108090 A1 | 5/2005 | Takeda et al. |
| 2005/0108127 A1 | 5/2005 | Brown et al. |
| 2005/0108144 A1 | 5/2005 | Longman et al. |
| 2005/0108252 A1 | 5/2005 | Pfaltz et al. |
| 2005/0108563 A1 | 5/2005 | Becker et al. |
| 2005/0110690 A1 | 5/2005 | Ko et al. |
| 2005/0113162 A1 | 5/2005 | Olive et al. |
| 2005/0116951 A1 | 6/2005 | Stephenson |
| 2005/0119934 A1 | 6/2005 | Kamiyama |
| 2005/0120221 A1 | 6/2005 | Arnold et al. |
| 2005/0120868 A1 | 6/2005 | Hinman et al. |
| 2005/0124406 A1 | 6/2005 | Cannon |
| 2005/0125328 A1 | 6/2005 | Schluetter |
| 2005/0125363 A1 | 6/2005 | Wilson et al. |
| 2005/0129187 A1 | 6/2005 | Agapi et al. |
| 2005/0132420 A1 | 6/2005 | Howard et al. |
| 2005/0137963 A1 | 6/2005 | Ricketts et al. |
| 2005/0138158 A1 | 6/2005 | Challener et al. |
| 2005/0138560 A1 | 6/2005 | Lee et al. |
| 2005/0138656 A1 | 6/2005 | Moore et al. |
| 2005/0141525 A1 | 6/2005 | Rose |
| 2005/0144068 A1 | 6/2005 | Calabria et al. |
| 2005/0144115 A1 | 6/2005 | Brett |
| 2005/0146745 A1 | 7/2005 | Umehara |
| 2005/0148384 A1 | 7/2005 | Marks et al. |
| 2005/0149394 A1 | 7/2005 | Postrel |
| 2005/0149454 A1 | 7/2005 | Chen et al. |
| 2005/0149855 A1 | 7/2005 | Loo et al. |
| 2005/0151722 A1 | 7/2005 | Meteyer |
| 2005/0153759 A1 | 7/2005 | Varley |
| 2005/0153760 A1 | 7/2005 | Varley |
| 2005/0153779 A1 | 7/2005 | Ziegler |
| 2005/0154804 A1 | 7/2005 | Stewart et al. |
| 2005/0155063 A1 | 7/2005 | Bayrakeri et al. |
| 2005/0157217 A1 | 7/2005 | Hendricks |
| 2005/0159203 A1 | 7/2005 | Bond et al. |
| 2005/0159213 A1 | 7/2005 | Okada et al. |
| 2005/0159220 A1 | 7/2005 | Wilson et al. |
| 2005/0162439 A1 | 7/2005 | Bates et al. |
| 2005/0163361 A1 | 7/2005 | Jones et al. |
| 2005/0164780 A1 | 7/2005 | Okada et al. |
| 2005/0165637 A1 | 7/2005 | Meyerhofer |
| 2005/0166064 A1 | 7/2005 | Dive-Reclus et al. |
| 2005/0170876 A1 | 8/2005 | Masci et al. |
| 2005/0170880 A1 | 8/2005 | Walker et al. |
| 2005/0170885 A1 | 8/2005 | Poole et al. |
| 2005/0171847 A1 | 8/2005 | Ling |
| 2005/0171903 A1 | 8/2005 | Yacobi et al. |
| 2005/0171904 A1 | 8/2005 | Yacobi et al. |
| 2005/0173519 A1 | 8/2005 | Gatto |
| 2005/0177417 A1 | 8/2005 | Koreyasu |
| 2005/0177427 A1 | 8/2005 | Mount et al. |
| 2005/0177519 A1 | 8/2005 | Block |
| 2005/0177859 A1 | 8/2005 | Valentino, III et al. |
| 2005/0178829 A1 | 8/2005 | Rosenberg |
| 2005/0181796 A1 | 8/2005 | Kumar et al. |
| 2005/0181858 A1 | 8/2005 | Caro et al. |
| 2005/0181860 A1 | 8/2005 | Nguyen et al. |
| 2005/0182589 A1 | 8/2005 | Smocha et al. |
| 2005/0182681 A1 | 8/2005 | Bruskotter et al. |
| 2005/0182687 A1 | 8/2005 | Godfrey, Jr. |
| 2005/0185638 A1 | 8/2005 | Begis |
| 2005/0192071 A1 | 9/2005 | Matsuno et al. |
| 2005/0192081 A1 | 9/2005 | Marks et al. |
| 2005/0192800 A1 | 9/2005 | Thyssen |
| 2005/0193015 A1 | 9/2005 | Logston et al. |

FOREIGN PATENT DOCUMENTS

| | | |
|---|---|---|
| EP | 0 875 816 A2 | 11/1998 |
| EP | 0 896 308 A1 | 2/1999 |
| EP | 1 125 617 A2 | 8/2001 |
| GB | 2141907 A | 1/1985 |
| JP | H11-114217 A | 4/1999 |
| JP | 4272917 B2 | 6/2009 |
| WO | 01/01304 A1 | 1/2001 |
| WO | 01/33478 A1 | 5/2001 |
| WO | 01/65358 A2 | 9/2001 |

(56) References Cited

FOREIGN PATENT DOCUMENTS

| WO | 03/004119 A2 | 1/2003 |
|---|---|---|
| WO | 03/029936 A1 | 4/2003 |
| WO | 2005/044412 A1 | 5/2005 |

OTHER PUBLICATIONS

GameSages Webpage, "GameSages—The Cure for the Common Cold," Snowball.com, Inc., Copyright © 2000, Jun. 12, 2000, 4 pages.
GameShark Webpage, "About GameShark," InterAct Accessories, Inc., Copyright © 2000, Jun. 14, 2000, 3 pages.
Cheat Codes 2000 Webpage, Cheat Codes 2000: Main Index, Copyright © 1994-2000, Yahoo! Inc., Jun. 12, 2000, 1 page.
Cheatcc.com Webpage, "Cheat Codes," Copyright © 1994-2000, Yahoo! Inc., Jun. 12, 2000, 2 pages.
EBSCO Host Research Database, http://web7.epnet.com/.
Internet Archive Wayback Machine, http://web.archive.org/web/1996051219457/http://www.happypuppy.com/.
"Freaky Cheats, wysiwyg://142/http://www.freaky-cheats.com/index2.asp," *Leviathan Press*, May 31, 2000, 3 pages.
Martini, A., et al., "Cyberguide:games—Happy Puppy Cheats & Hints," *NetGuide*, May 1996, 3(5), 4 pages.
Office Action from U.S. Appl. No. 13/617,173, dated Dec. 21, 2012, 75 pages.
Final Office Action from U.S. Appl. No. 12/603,098, dated Dec. 20, 2012, 75 pages.
Office Action for U.S. Appl. No. 12/603,098, dated Sep. 7, 2016, 34 pages.
Office Action for U.S. Appl. No. 13/617,173, dated Sep. 22, 2016, 28 pages.
Final Office Action for U.S. Appl. No. 13/617,173, dated Jun. 30, 2017, 27 pages.
Office Action from U.S. Appl. No. 09/676,448 dated Aug. 1, 2002, 14 pages.
Office Action from U.S. Appl. No. 09/676,448, dated Dec. 30, 2002, 9 pages.
Office Action from U.S. Appl. No. 09/676,448, dated Mar. 15, 2002, 19 pages.
Office Action from U.S. Appl. No. 09/676,448, dated Mar. 18, 2003, 9 pages.
Notice of Allowance for U.S. Appl. No. 09/676,448, dated Mar. 9, 2006, 55 pages.
Office Action from U.S. Appl. No. 09/676,448, dated May 20, 2005, 14 pages.
Office Action from U.S. Appl. No. 09/676,448, dated May 5, 2004, 9 pages.
Non-Final Office Action received from U.S. Appl. No. 12/603,098 dated Oct. 16, 2018, 105 pages.
Non-Final Office Action received from U.S. Appl. No. 13/617,173 dated Dec. 14, 2018, 60 pages.
Non-Final Office Action for U.S. Appl. No. 12/603,098, dated Dec. 15, 2011, 21 pages.
Final Office Action for U.S. Appl. No. 12/603,098, dated Apr. 6, 2017, 31 pages.
Final Office Action for U.S. Appl. No. 13/617,173, dated Oct. 24, 2013, 22 pages.
Final Office Action from U.S. Appl. No. 09/676,448, dated Nov. 12, 2004, 11 pages.
Notice of Allowance received from U.S. Appl. No. 09/676,448, dated Mar. 9, 2006, 55 pages.

\* cited by examiner

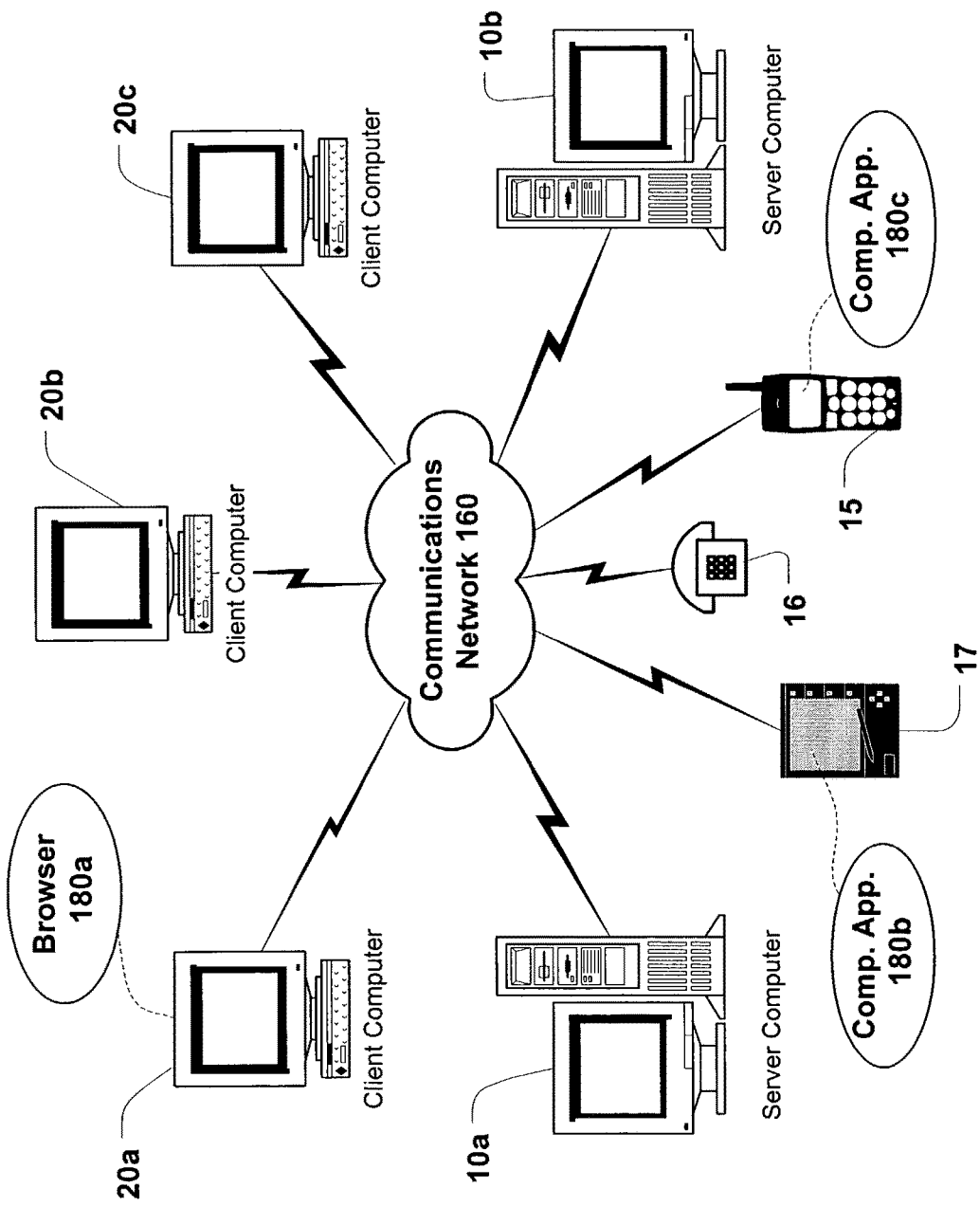

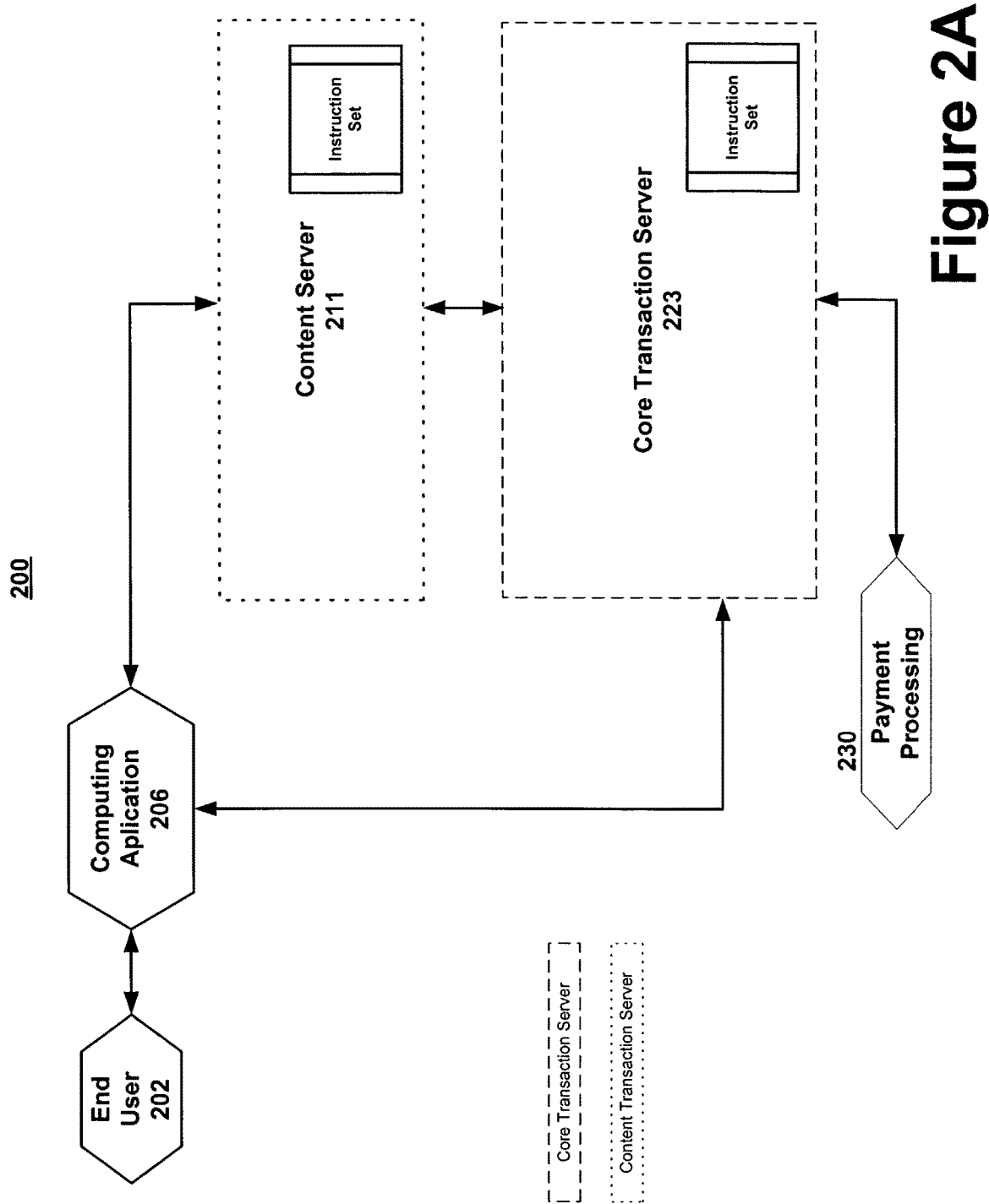

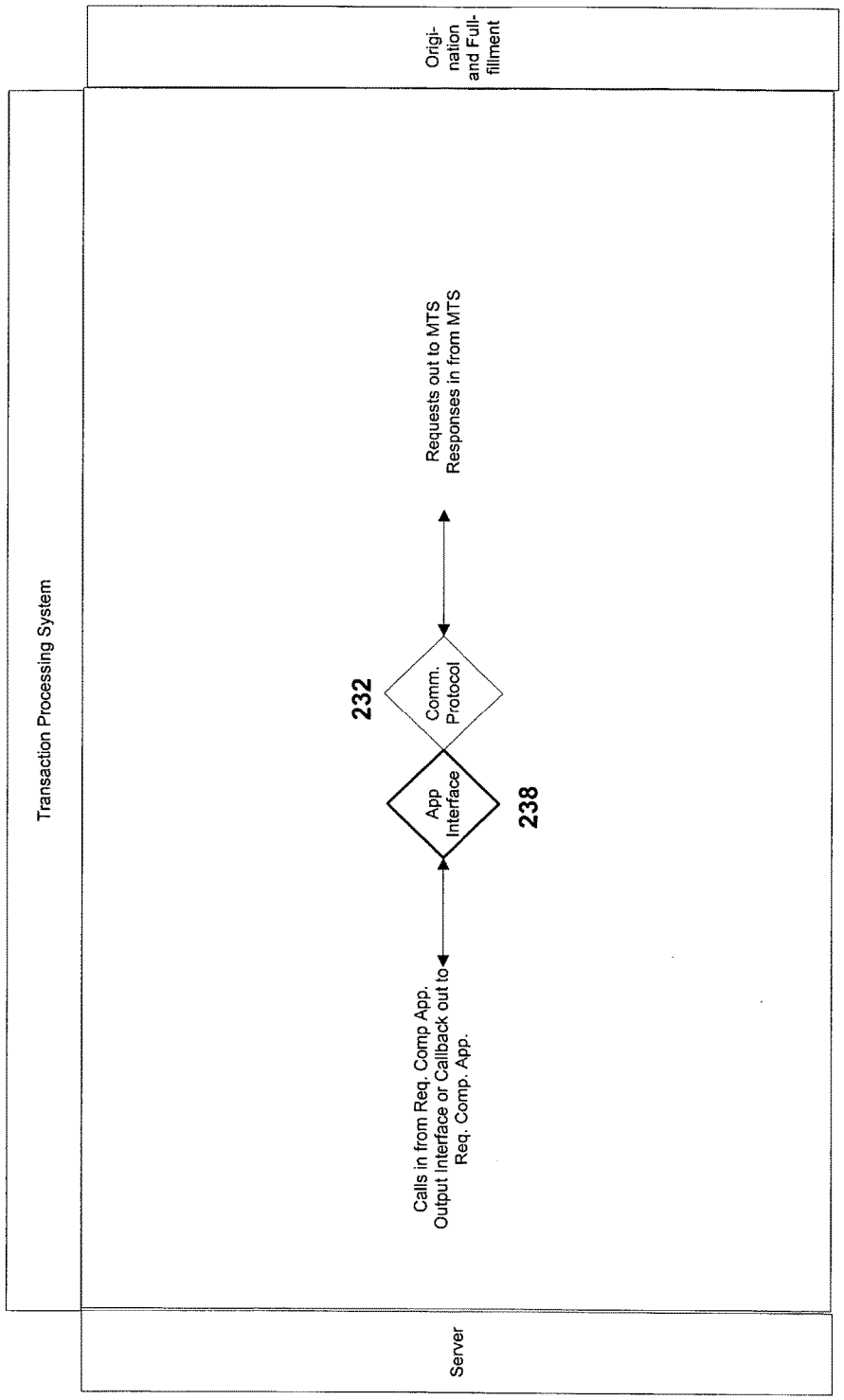

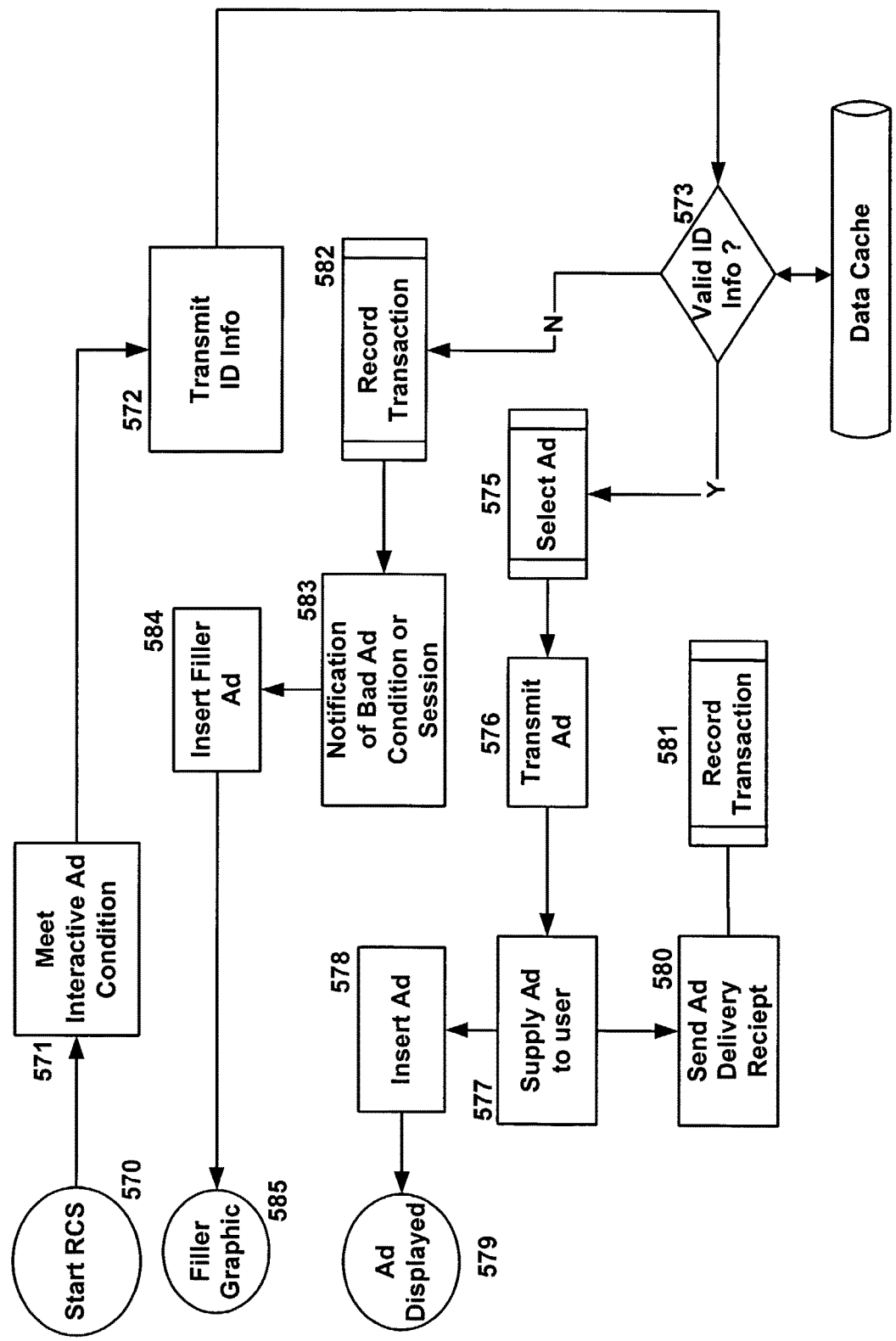

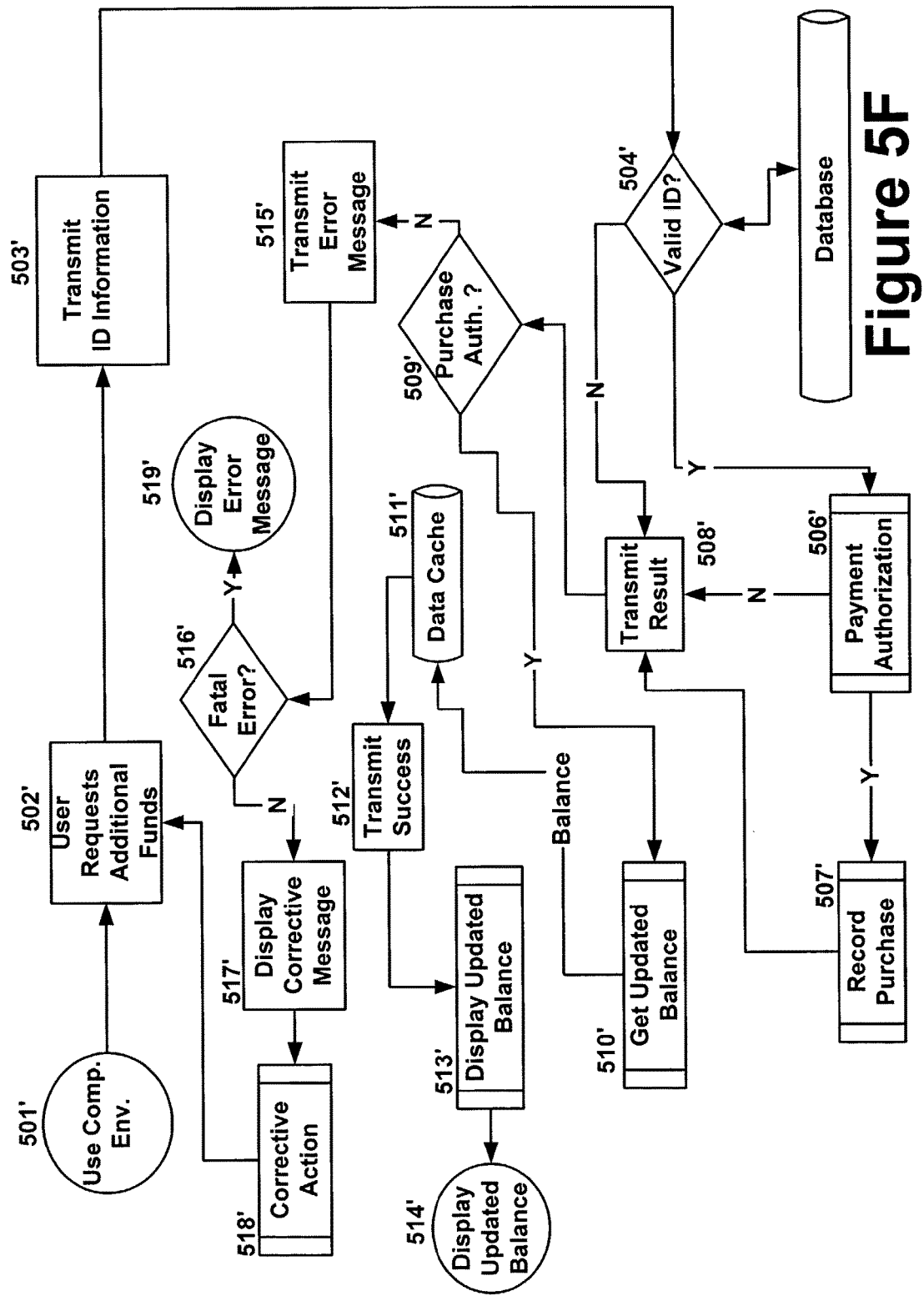

COMPUTING ENVIRONMENT TRANSACTION SYSTEM TO TRANSACT COMPUTING ENVIRONMENT CIRCUMVENTIONS

This application is a continuation-in-part of application Ser. No. 09/676,448, filed Sep. 29, 2000, which claims the benefit of Provisional Application Ser. No. 60/212,749, filed Jun. 20, 2000, the entirety of each are incorporated herein by reference.

FIELD OF THE INVENTION

The present invention relates generally to the creation, integration, and transaction of instances when predefined rules that govern a particular environment are circumvented. Particularly, the present invention relates to providing an ability to circumvent predefined rules of a computing environment through a transaction where the ability is integrated within the computing environment and is exploited as the computing environment is navigated.

BACKGROUND OF THE INVENTION

Today, we face many challenges in our daily lives that demand the expenditure of valuable resources. These challenges are presented as part of an environment (e.g. non-computing and/or computing environments) that is itself governed by a set of operating rules. In an ideal world, a person navigating through these environments would have the ability to change or re-define those rules to assist in disposing of encountered challenges. For every rule there is a sanction, a retribution, a reprimand, and in some cases a punishment which can be levied by a governing authority and/or environment operator for breaking or circumventing the environment rule. Some environments may not offer a sanction, reprimand, retribution, or punishment when a rule is broken, bur rather may be structured that it is virtually impossible to circumvent or break an environment rule. Accordingly, on balance, most people when navigating in an environment try their best to adhere to the environment rules, or in the case where there is no risk for rule breaking, do not attempt to break or circumvent rules as the environment structure makes it difficult to break the environment rules. Even if one were to choose to break an environment rule, in most environments there are not mechanisms that allow for rule breaking that either mitigate or completely remove risk.

To stay competitive in a particular environment and to optimize the position in the environment by exploiting the predefined rules, rigorous physical and/or mental training, or the use of advanced tools may be required. However, for the non-scrupulous, the same maybe be achieved by circumventing and/or breaking the predefined rules. The rules may be broken, for example, through bribery, cheating, and deception. Such rule circumvention and/or breaking has allowed for some significant events in our society today. For example, some ventures, and even some governments can base their existence on the practice of breaking environment rules, or at the least circumventing the predefined environment rules to more quickly achieve a desired goal. Subscribing to social conventions, however, breaking rules is traditionally kept secret in fear of retaliation, reprimand, and rebuke from non-sanctioning parties. Considering the benefits that may be realized from circumventing and/or breaking predefined rules of an environment, if given the choice, most would to circumvent and/or break the environment predefined rules to assist them with their daily challenges.

Human nature dictates our need to achieve. This is apparent in the field of gaming. Gaming enthusiasts are willing to pay for the opportunity to have the ability to circumvent and/or break the predefined rules of the computer game. This is especially the case where the player has spent a significant amount of time and energy in overcoming various challenges within the game to reach the desired goal of completing the game, but is unable to overcome a particular posed challenge. In such a circumstance, the player will likely be willing to pay for the ability to overcome this posed challenge through the circumvention of a predefined rule that helps define the challenge. In recent years, gaming enthusiasts have enjoyed a number of action, action-adventure, adventure, and strategy games, such as, DOOM®, QUAKE®, AGE OF EMPIRES®, ULITMA ONLINE®, etc. The object of these games is to wage battle with various beings in an effort to win a war or improve your standing within the game and/or gaming community. These games are typically structured such that the player is given access to increasingly superior weaponry and/or skills as they advance through increasingly difficult game levels. In an ideal world, gamers would be able to have access to these superior weapons, or alternatively, additional ammunition for their existing weaponry, and/or superior skills earlier in the gaming experience, thereby increasing the gamers chances of completing computer game levels.

Current practices and conventions require gamers to ferret through computer game reference information, such as computer game hint books and computer game hint Websites to find what are touted as credible and reliable hints that are advertised, if used, would help garners more easily play a computer game. A hint may provide information such as button combinations that would allow gamers to circumvent and/or break the predefined rules of a computer game (e.g. obtain a superior weapon instantaneously without having to complete a game level or having to find it in the computer game environment). However, these practices place a significant burden on gamers as they are required to spend their time and energy tracking these hints down. Also, there is no guarantee that the hint actually works as advertised. The gamer is thus exposed to the possibility of trying numerous hints before finding one that achieves the desired computer game predefined rule circumvention and/or rule breaking (e.g. obtaining a superior weapon). Moreover, there is a disconnect in the activities surrounding the actual playing of a computer game and incorporating a found hint in the game being played. That is, the hints are not integrated within the computer game environment and exist external to the computer game.

Moreover, currently, computer game developers are not afforded the ability to monetize the existing practice of rule circumvention. Typically, computer game developers invest significant resources, both labor and capital, to create a computer game having a specific set of rules (e.g. collect four bottles in a particular level and the game will advance the participating user to the next game level). In some instances, the computer game (or other computing environment) is configured such that the participating user is required to complete an entire level before advancing and are configured to only to perform a save at the beginning of a particular game level. Such game configuration, which is often the case, frustrates participating gamers as they are required to repeat a portion or more of a particular level each time the game is played. Such frustration leads gaming enthusiasts to search for rule circumvention techniques to avoid the games rigid configuration.

A more advantageous practice contemplates providing enhanced entertainment options for a computer game wherein a mechanism is offered to gaming developers for integration with within a computer game that offers the ability to gamers to circumvent and/or break the predefined rules of the computer game while the game is being played. This practice further contemplates the ability to transact the instance in which the gamer accepts the offers provided by the mechanism while the game is being played. Such practice would eliminate the time and effort expenditure required by existing practices and protect the gamer from using faulty hints. Moreover, the enhanced entertainment option would provide interactive advertisements that are seamlessly integrated within the computer game allowing users to purchase products and/or services or receive desired information while the game is being played.

From the foregoing it can be appreciated that there exists a need for comprehensive systems and methods that offer computing environment operators the ability to monetize the circumvention of rules in the environment such that participants of an environment are allowed to circumvent environment rules using an integrated mechanism which is invoked through a transaction.

SUMMARY OF THE INVENTION

The present invention is directed to providing systems and methods that provide computer environment operators a mechanism for integration within the computing environment that allows participating users of the computing environment the ability to circumvent and/or break predefined rules of a computer game environment through a transaction. In an illustrative implementation, the systems and methods described herein comprise a core transaction server, a multimedia transaction server and a browsing application. These components may exist in a single standalone computer or act as components of a networked computing environment. In operation, a computer game environment cooperates with the core transaction server to integrate, transact, manage, and execute instances where the predefined rules of the computer game environment are broken. The cooperating computer game environment, in this context, is capable of offering and executing, and transacting enhanced entertainment options.

In the contemplated implementation, the browser application is employed to accept input from a participating user indicative of a desire to have access to the capability of circumventing the predefined rules of one or more cooperating game environments and/or to request access to execute interactive advertisements integrated within the enhanced computer game environment. This input is processed and stored by the core transaction server for use when executing and transacting instances of rule breaking and/or interactive advertisement execution. The core transaction server also cooperates with the multimedia transaction server to retrieve for and present to the cooperating computer game environment with requested and/or targeted multimedia for presentation to participating users when interacting with the computer game environment.

In implementation provided, an account is established through a series of inputs received through the browsing application for participating users. The account information is stored on the core transaction server for future use. In addition, the core transaction server cooperates with the computer game environment to provide data representative of integrated enhanced entertainment options. Further the core transaction server cooperates with the multimedia transaction server to supply the computer game environment with multimedia data for use in transacting the enhanced entertainment options. In operation, a participating user interacts with a computer game environment supporting the enhanced entertainment options to exploit one or more of the available options through an account transaction. The core transaction server cooperated with the computer game environment to track, execute, and manage enhanced entertainment options transactions by updating the participating users account information (e.g. debiting the account when an option is executed) and providing the requested entertainment option data through the cooperation with the multimedia transaction server.

The enhanced entertainment options include the option to circumvent one or more of the predefined rules of the computer game environment such that the predefined rule is broken while the participating user plays the game (or games) offered by the computer game environment. In addition, the entertainment enhancement options may include the option to interact with one or more integrated interactive advertisements, such that the interaction with the integrated interactive advertisements initiates the execution of a desired event, function, action, or scenario.

Other features of the present invention are described below.

BRIEF DESCRIPTION OF THE DRAWINGS

A system and methods for the creation, integration, and transaction of rule circumventions are further described with reference to the accompanying drawings in which:

FIG. 1A is a system diagram of an exemplary computing network environment in accordance with the herein described systems and methods;

FIG. 2A' is a detailed system diagram showing the interaction between exemplary computing environment components in accordance with an illustrative implementation of the herein described system and methods;

FIG. 2D' is a block diagram of illustrative data flow between exemplary computing environment components in accordance with the herein described system and methods;

FIG. 2E is a block diagram showing the operation of an illustrative interface component in accordance with herein described systems and methods;

FIG. 5C is a detailed flow diagram of the processing performed when offering and executing interactive advertisements in accordance with the herein described systems and methods;

FIG. 5F is a detailed flow diagram of the processing performed to authenticate a request to update purchasing power by a participating user in accordance with the herein described systems and methods.

DETAILED DESCRIPTION OF ILLUSTRATIVE IMPLEMENTATIONS

Figure 1:
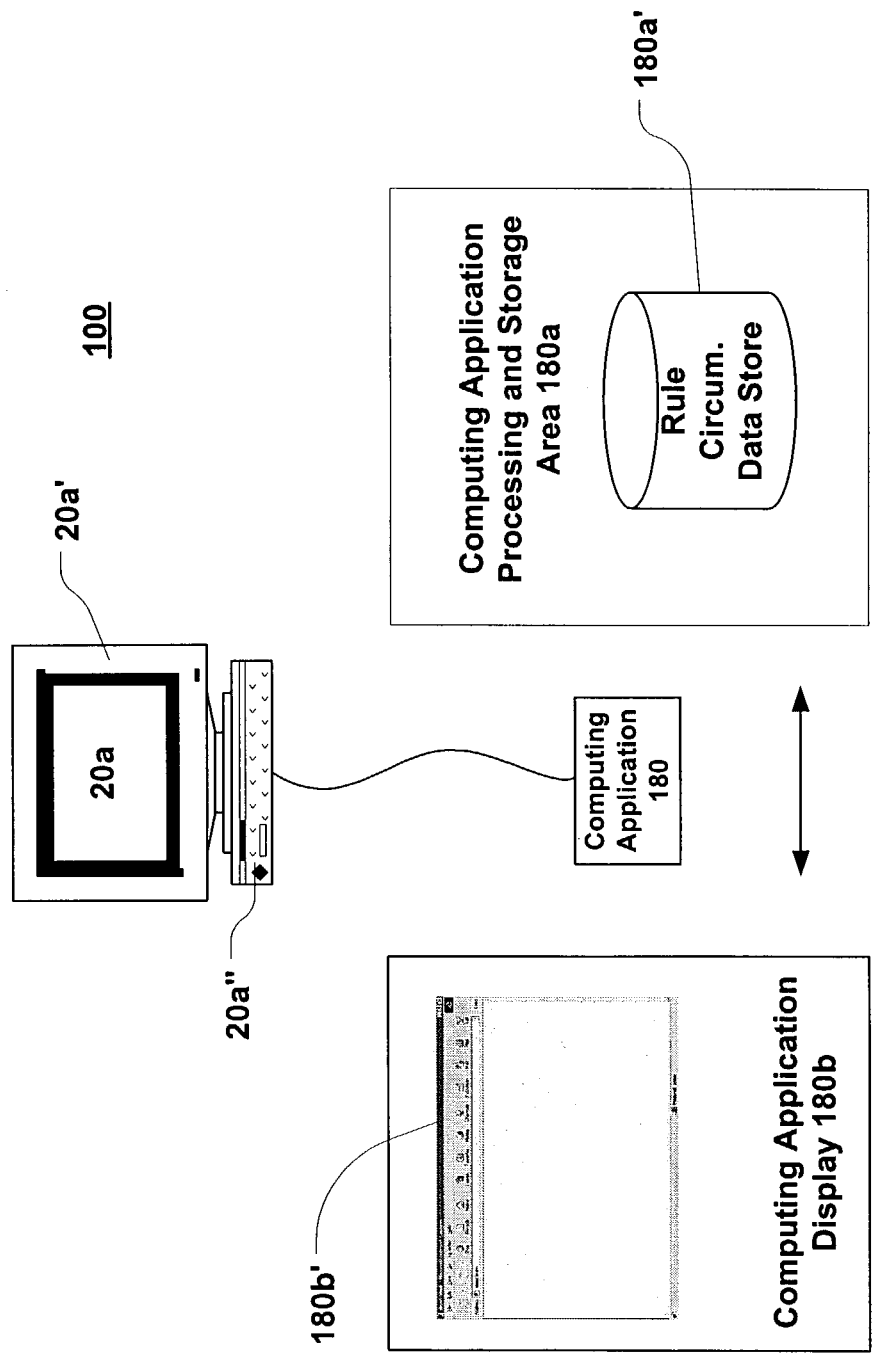
FIG. 1 is a system diagram of an exemplary computing environment in accordance with the herein described systems and methods.

Overview:

Computing environments (e.g. computer games) are defined by a set (or sets) of predefined rules. These rules help to describe how a particular computing environment (e.g. computer game) is to be navigated. Specifically, in the context of computer games, these rules may also describe the objective of a particular computer game, how to play a particular computer game, and provides structure for the various levels within a computer game. Conventionally, a computing environment operator (e.g. a computer game developer), when configuring the computing environment (e.g. designing the game), will define the rules for the computing environment (e.g. computer game) such that these rules cannot be circumvented. However, participating users (e.g. diehard computer gaming enthusiasts) have taken on the challenge of finding "cheats" to circumvent one or more of the predefined rules for a particular computing environment (e.g. computer game) such to more easily navigate through the particular computer environment. In the context of computer games, the "cheats" operate to make the game easier to play.

Consequently, instead of wasting hours upon hours to discover optimum ways of navigating a particular computing environment through the circumvention of one or more rules established for a computing environment (e.g. achieve a particular level within a computer game or to obtain one or more desired features within the computer game), the computing environment "cheats" may be employed to more easily achieve the desired levels and/or features. Currently, a participating user (e.g. a gamer) is required to search through various reference sources (e.g. game cheating books, the Internet, electronic message boards, etc.) to find what are advertised as reliable and functional cheats for a particular computing environment (e.g. computer games). The participating user (e.g. gamer) then is required to modify their computer game environment to incorporate the desired "cheat." Such modifications may entail executing sometimes incompatible executable software code which may have a significant and detrimental impact on the underlying computing environment (e.g. computer game). Also, execution of the "cheat", in most cases, must be performed each time the computing environment is encountered (e.g. game is played) placing an undue burden on the participating user (e.g. gamer).

Furthermore, existing practices do not capitalize on a substantial value proposition that can be offered to computing environment operators (e.g. game developers). Namely, game developers (or other computing environment operators) do not exploit the numerous instances in which participating users (e.g. gamers) circumvent one or more of the predefined rules of a given game (or a given computing environment). Generally, game developers (or other computing environment operators) overlook this significant value added proposition given that current practices do not include the transaction of instances when such environment (or game) rules are circumvented.

The present invention aims to ameliorate the shortcomings of existing practices surrounding the circumvention of the predefined rules (herein "circumventions") of a computing environment (e.g. computer game) such that the circumvention is integrated as part of the computing environment (e.g. computer game) and the execution of the circumvention is realized through a monetary transaction. In doing so, participating users (e.g computer gamers) are afforded the ability to circumvent one or more of the predefined rules of the computing environment (e.g. computer game) in real time as the user navigates through the computing environment (e.g. the game is being played providing an enhanced entertainment environment). Moreover, the execution of the rule circumvention is monetized to the benefit of the computing environment operator (e.g. computer game developer) and the participating user (e.g. computer gamer). Specifically, the computing environment operator (e.g. computer game developer), in using this invention, is provided with an additional revenue stream generated from the execution of integrated rule circumventions and the participating user (e.g. computer gamer) is afforded the ability to pay for proven, reliable, and fully functional rule circumventions in lieu of searching various reference sources and executing discovered "cheats" that may be hurtful to the cooperating computing environment (e.g. computer game).

Moreover, the inventive concepts described herein may be extended for use to integrate and transact interactive advertisements within a computing environment (e.g. computer game environment (i.e. providing an entertainment enhancement option)). In this context, instead of providing data to computing environment operators (e.g. computer game content providers) representative of a computing environment (e.g. computer game) circumvention, the data is representative of one or more interactive advertisements, that when interacted with during general computing environment interaction (e.g. game play), trigger the execution of one or more predefined scenarios.

For example, in a simulation computer game, the gamer might traverse through a city having simulated store fronts. Conventionally, these simulated store fronts are static, that is non interactive and are provided merely as background scenery or to add realism to the computer game environment. In a contemplated implementation of the present invention, the invention may be used to integrate an interactive advertisement in the computer game (i.e. rendering the computer game to be an enhanced computer game or a computer game with enhanced entertainment options—EEO) such that the previously static storefronts become interactive so the gamer can interact with the advertisement through the computer game to obtain the advertised product or service.

An exemplary scenario is a computer gamer, playing the game around meal time, traverses through a simulated city comes upon a "pizza joint". The computer gamer, being entrenched in the computer game, forgets that he/she has not eaten all day. Conventionally, the gamer would have to stop play of the computer game to obtain, order, and/or food. In the enhanced computer game, the "pizza joint" is interactive so that the computer gamer can interact with the simulated representation of the "pizza joint" to order a pizza for delivery to the computer gamer's house. Specifically, the present invention would act to transact the pizza order between the gamer and cooperating real-world pizza restaurants using the computer gamer's transaction account. The systems and methods disclosed herein support the realization of such scenario.

Identifying Computer Environment Circumvention Opportunities:

In the context of a computer game, exemplary rule circumventions may include access to additional ammunition (or other resource—e.g. additional turns), information about the game environment, and numerous other items can be quantified by the game designer as suitable computer game rule circumventions that can be created, integrated, and transacted. Similarly, advertisers may provide suitable interactive advertisements for integration within a computer game allowing for the purchase of desired products and/or services.

Specifically, an integration partner may work with computer game developers to offer a rule circumvention transaction system for integration within one or more of the cooperating computer game developer's computer games. The rule circumvention transaction system would exploit the rules of an already developed and deployed computer game to provide a mechanism by which the existing rules of a given computer game can be circumvented through the execution of at least one transaction. This transaction may include, but is not limited to the exchange of monetary consideration, the exchange of established good will (e.g. membership points as part of a membership reward program), and the exchange goods and services (e.g. cooperating users are provided credits for circumventing rules if the cooperating user assists subscribing additional users to use and pay for rule circumvention abilities).

Creating Computing Environment Rule Circumventions:

Once identified, the computer game developers and/or participating advertisers working alone, or in concert with a technology integration partner, will make their computing environment (e.g. computer game) available to interact with one or mechanisms that circumvent one or more of the identified computing environment rules (e.g. to realize a circumvention opportunity). Generally, there are several requirements that are considered when creating computer game circumventions. These requirements include the rights of control over the computer game circumvention (i.e. who has the authority to edit, modify, and offer the computer game circumvention). In the context of a computer game, the computer game designer controls the resources of the game thereby having the ability to create and provide the computer game circumvention to game participants. In this capacity, the computer game circumventions offered to participating gamers may give some control over a game's resources (e.g. ammunition, lives, etc) for a predetermined price. The circumvention designer can decide the nature and extent of such control based on any number of factors such as cost, purchase history, demographic data, etc.

Comparatively, the integration of interactive advertisements can either be initiated, designed, and deployed by the computer game developer in cooperation with the advertisers seeking to place interactive advertisements or by a third party multimedia developer working in between interested advertisers and computer game developers to provide content representative of interactive advertisements for placement in a computer game. In operation, an advertiser seeking to place their advertisements in spaces already contracted to their competitors may approach a third party multi-media developer to create and generate the interactive advertisement for placement in a particular game. Alternatively, the advertiser, if properly resourced, may instead, choose to work with the game developer directly to create and place the desired interactive advertisement.

Integrating Computing Environment Rule Circumventions:

Once a computer game circumvention and/or interactive advertisement is identified and created, it is integrated within the computing environment and coupled to a transaction system for transacting. The integration of the computer game circumventions and/or depends heavily on the size, scale, and complexity of the computer game in which the circumvention and/or interactive advertisement is to be offered.

Moreover, an exemplary transaction system for use to transact computer game circumventions and/or interactive advertisements may include security to protect the integrity of the transaction and the computer game circumvention and/or interactive advertisement being transacted and communication means to inform participating users of the availability of a circumvention and/or interactive advertisement and information regarding the price and description of the computer game circumvention and/or interactive advertisement. Additionally, this system may track and store participating users' information such as demographic information, buying habits, preferences or tastes. This information is subsequently used to determine the popularity of circumventions and/or interactive advertisements and to assist in identifying and creating new computer game circumventions and/or interactive advertisements that can be tailored to participating users' preferences. Further, the exemplary transaction system may include inventory, sales, and tracking information for the various rule circumventions offered and sold. Optionally, the system may include one or more pricing mechanisms that set prices for computer game circumventions based on a variety of factors. These factors include: participating users' preferences, cost, supply and demand. Further pricing may be realized through auctions, reverse auctions, forecasting techniques or other methods.

Transacting Computing Environment Rule Circumventions:

Generally, there are three steps performed when transacting a rule circumvention event (e.g. computer game circumventions and/or interactive advertisements): 1) transaction request, 2) transaction processing, and 3) transaction fulfillment. During the first step a participating user requests a circumvention to circumvent one or more of the predefined rules of a computer game (e.g. receiving additional ammunition automatically or additional lives). The request is processed by the systems of the present invention to determine if the request can be successfully fulfilled. This determination may involve checking the profile and account balance of the requesting participating user to see if they are qualified for the requested circumvention and ensuring the participating user has requested a valid circumvention. If the participating user qualifies, the user's account is debited and the requested circumvention is provided (i.e. transaction fulfillment occurs). The transaction occurs in a real time two-way transaction. It should be noted, however, that a user may still have access to the rule circumvention system if they do not qualify. In this context, computing environment operators (e.g. game developers) may choose to provide access to the rule circumvention system described herein to unqualified users for various reasons, including but not limited to, promotional purposes (e.g. providing a new unqualified user a sample rule circumvention in the hopes of attracting a new rule circumvention customer), market research purposes (e.g. to test the acceptance by users of a new rule circumvention), and technical testing purposes.

For example, a participating user navigating in a computing game environment requests more ammunition. The user is processed and if qualified, received the ammunition immediately—the accounting for which is settled latter. This permits the participating user to continue in their computing game environment (i.e. continue playing the game) without the usual interruption of transaction processing. Additional features of rule circumvention comprise any of: keeping a tally for each user, each instance a rule is circumvented, aggregating the instances to generate a billing statement, and reconciling payment from participating users against outstanding billing statements.

The process is similar when transacting interactive advertisements except that the present invention may or may not perform transaction fulfillment for products and/or services ordered through the transaction system. In the instance that the transaction is fulfilled by the transaction system, the transaction system electronically delivers the products and/or services requested by the participating users. For example, a participating user may come across an interactive advertisement for a software upgrade and may decide to purchase the software upgrade through an interaction with the interactive advertisement. In this instance, the transaction system is capable of delivering the software upgrade (i.e. if it is in inventory) to the requesting participating user.

Alternatively, the order for a desired product and/or service requested through the transaction of an interactive advertisement is communicated by the transaction system of the present invention to the vendor of the requested product and/or service. The vendor then delivers the requested product and/or service. It may be the case that the computer game content provider be the vendor to deliver the requested service and/or product (an electronic data product and/or service) as part in parcel with a selected circumvention. In such instance, the systems and methods of the present invention are capable to deliver the requested product and/or service.

Although, the transaction of rule circumventions has been described above, such description is merely introductory and should be read with the detailed description of transacting rule circumventions found below.

It is appreciated and understood that although the systems and methods described herein have been directed to the identification, creation, and transaction of circumventions of rules within a computer game, that the inventive concepts described herein are not limited to such exemplary implementation, but rather are applicable to various computing environments having one or more predefined rules.

As will be described below with respect to FIGS. 1-5G, the systems and methods described herein enable the procurement and transaction of computer environment rule circumventions and/or interactive advertisements.

Illustrative Computing Environment

FIG. 1 shows computing system 100 that may support the present invention. Computing system 100 comprises computer 20a that may comprise display device 20a' and interface and processing unit 20a". Computer 20a may support computing application 180. As shown, computing application 180 may comprise computing application processing and storage area 180a and computing application display 180b. Computing application processing and storage area 180a may contain rule circumventions data store 180a'. Similarly, computing application display 180b may comprise display content 180b'. In operation, a user (not shown) may interface with computing application 180 through the use of computer 20a. The user (not shown) may navigate through computing application 180 to obtain various computer environment rule circumventions and/or access various interactive advertisements. Computer environment rule circumventions and/or interactive advertisements may be retrieved by computing application 180 from rule circumventions data store 180a' of computing application processing and storage area 180a and shown to a user (not shown) as display content 180b' on computing application display 180b. The user (not shown) may choose to purchase certain computer environment rule circumventions and/or access various interactive advertisements. Transacted computer environment rule circumventions and/or interactive advertisements may be stored in cooperating data store 180a' and associated to created and stored user accounts. Such user accounts may be used in operation to facilitate the transaction of computer environment rule circumventions and/or the execution of interactive advertisements and may be communicated to cooperating circumvention and interactive advertisement content providers (not shown).

Illustrative Computer Network Environment

Computer 20a, described above, can be deployed as part of a computer network. In general, the above description for computers applies to both server computers and client computers deployed in a network environment. FIG. 1A illustrates an exemplary network environment, with a server in communication with client computers via a network, in which the present invention may be employed. As shown in FIG. 1A, a number of servers 10a, 10b, etc., are interconnected via a communications network 160 (which may be a LAN, WAN, intranet, the Internet, or other computer network) with a number of client computers 20a, 20b, 20c, or computing devices, such as, mobile phone 15, land-line telephone 16, and personal digital assistant 17. In a network environment in which the communications network 160 is the Internet, for example, the servers 10 can be Web servers with which the clients 20 communicate via any of a number of known protocols, such as, hypertext transfer protocol (HTTP) or wireless application protocol (WAP). Each client computer 20 can be equipped with browser 180a to gain access to the servers 10. Similarly, personal digital assistant 17 can be equipped with computing application 180b and mobile phone 15 can be equipped with computing application 180c to display and receive various data.

In operation, a user (not shown) may interact with a computing application running on a client computing devices to obtain a variety of rule circumventions. The rule circumventions may be stored on server computers and communicated to cooperating users through client computing devices over communications network 160. A participating user may purchase a computing environment rule circumvention and/or request the ordering of a product and/or service (including the display of advertisement information) through an interactive advertisement by interfacing with computing applications on client computing devices, thereby creating a enhanced entertainment option transaction. These transactions may be communicated by client computing devices to server computers for processing and storage. Server computers may host computing applications for the processing of circumvention and interactive advertisement transactions and cooperating data stores for the storage of such transactions.

Thus, the systems and methods described herein can be utilized in a computer network environment having client computing devices for accessing and interacting with the network and a server computer for interacting with client computers. However, the systems and methods providing the creation, integration, and transaction of rule circumventions and interactive advertisement can be implemented with a variety of network-based architectures, and thus should not be limited to the example shown. The present invention will now be described in more detail with reference to a presently illustrative implementation.

Computing Environment Rule Circumvention Transactions

Figure 1B:
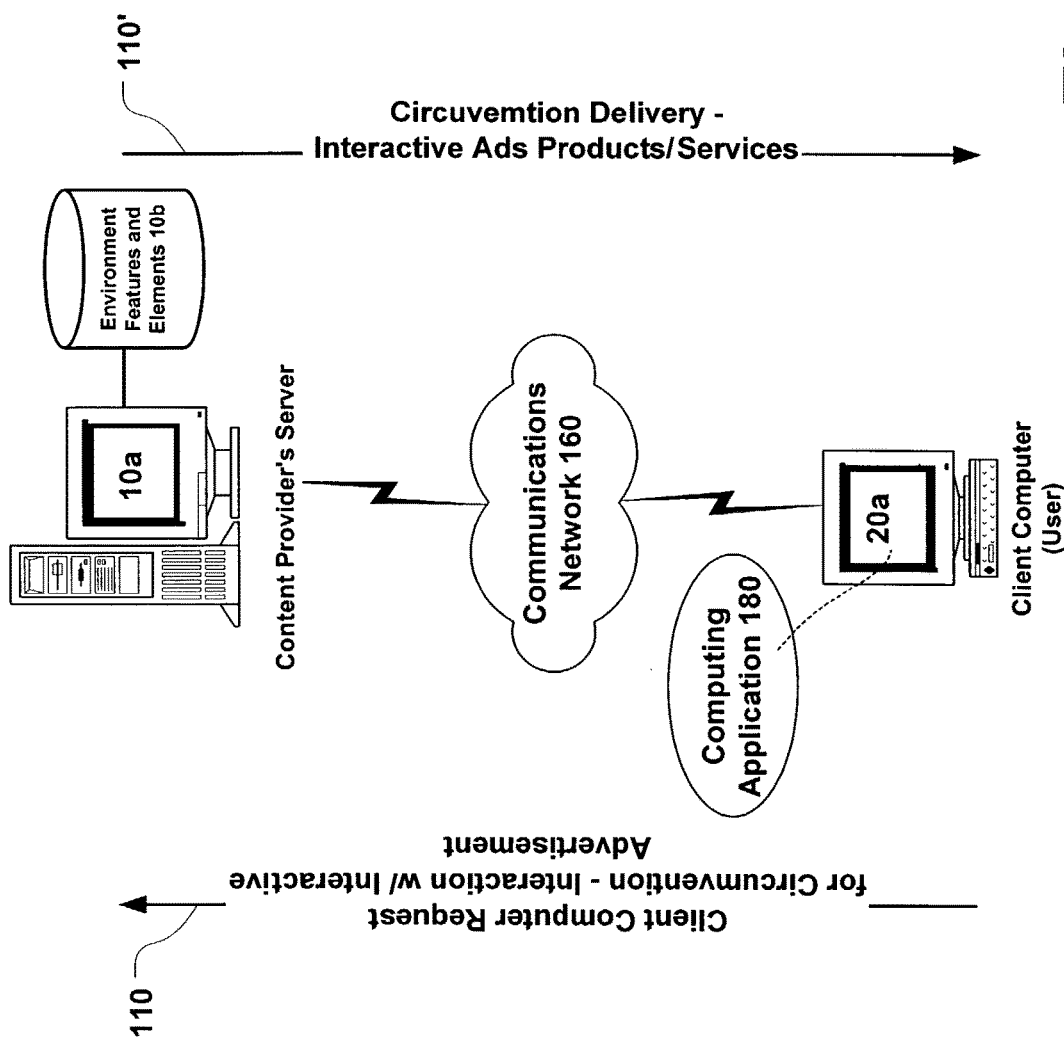
FIG. 1B is a system diagram showing the interaction between exemplary computing components in accordance with the herein described systems and methods.

FIG. 1B shows the cooperation of various computing elements when transacting computer game circumventions and interactive advertisements (i.e. entertainment enhancement options) within a computer game environment. A participating user may employ computing application 180 operating on client computer 20a to send a request for computer game circumvention content and/or interactive advertisement content 110 to content provider's server 10a over communications network 160. In response, content provider's server 10a may process send the request and retrieve environment features and/or elements (i.e. computer game circumventions) content and/or interactive advertisements content from environment features and elements database 10b for communication to client computer 20a over communications network 160 as shown by arrow 110'. Further, participating user may employ computing application 180 to communicate requests to purchase products and/or services offered by the interactive advertisements. The interactive advertisement products and/or services may be requested by participating users by interacting with the interactive advertisement or, alternatively, the products and/or services may be offered to participating users based on conditions (e.g. a participating user passes a rendition of cellular phone shop in a computing application game and is prompted on whether he/she would like to purchase a cellular phone or, alternatively, if already owning a cellular phone, whether he/she would like to pay their bill, or some other consumer scenario).

Figure 2:
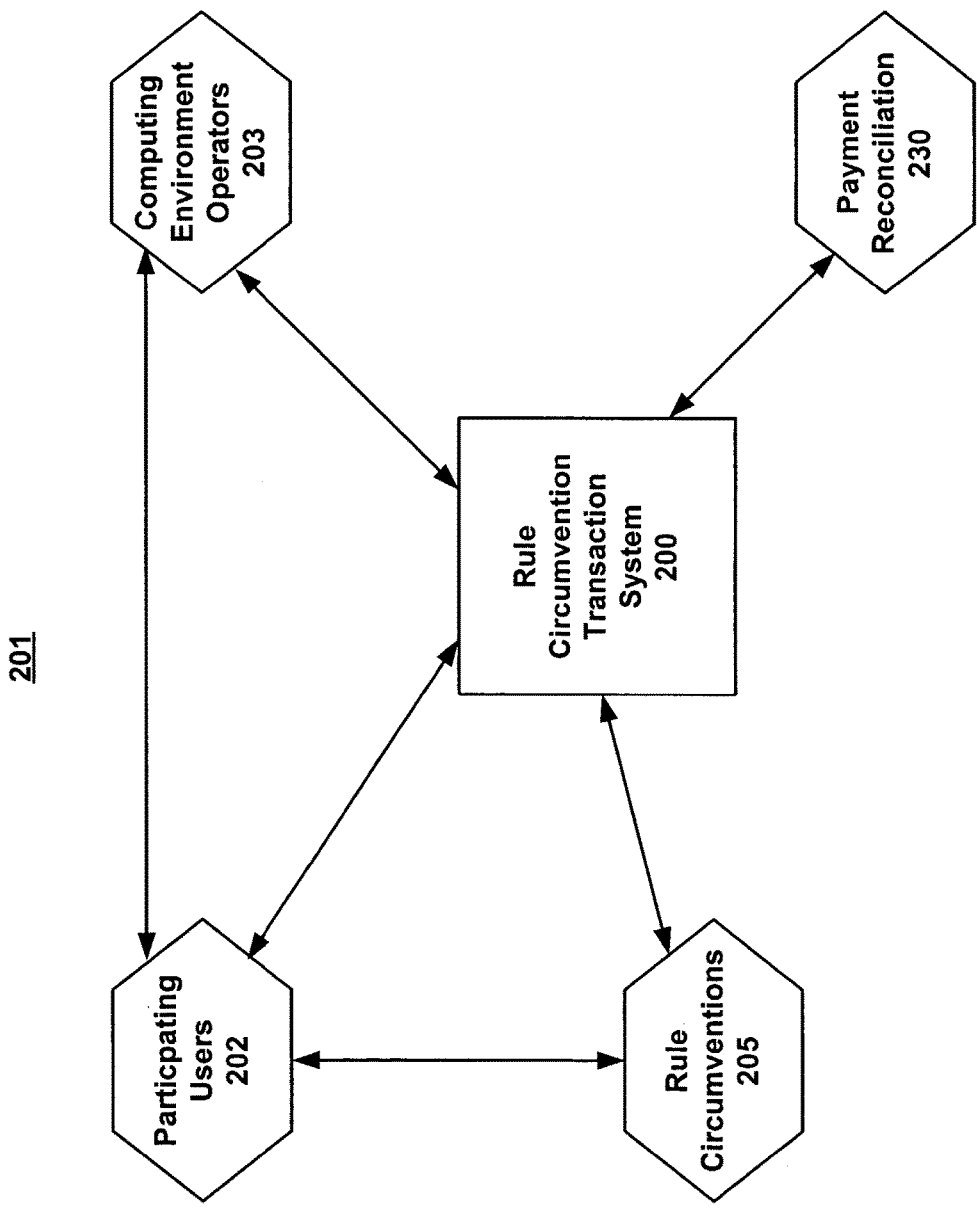
FIG. 2 is a block diagram showing the interaction between participating parties employing the systems and methods described herein.
Figure 2A:
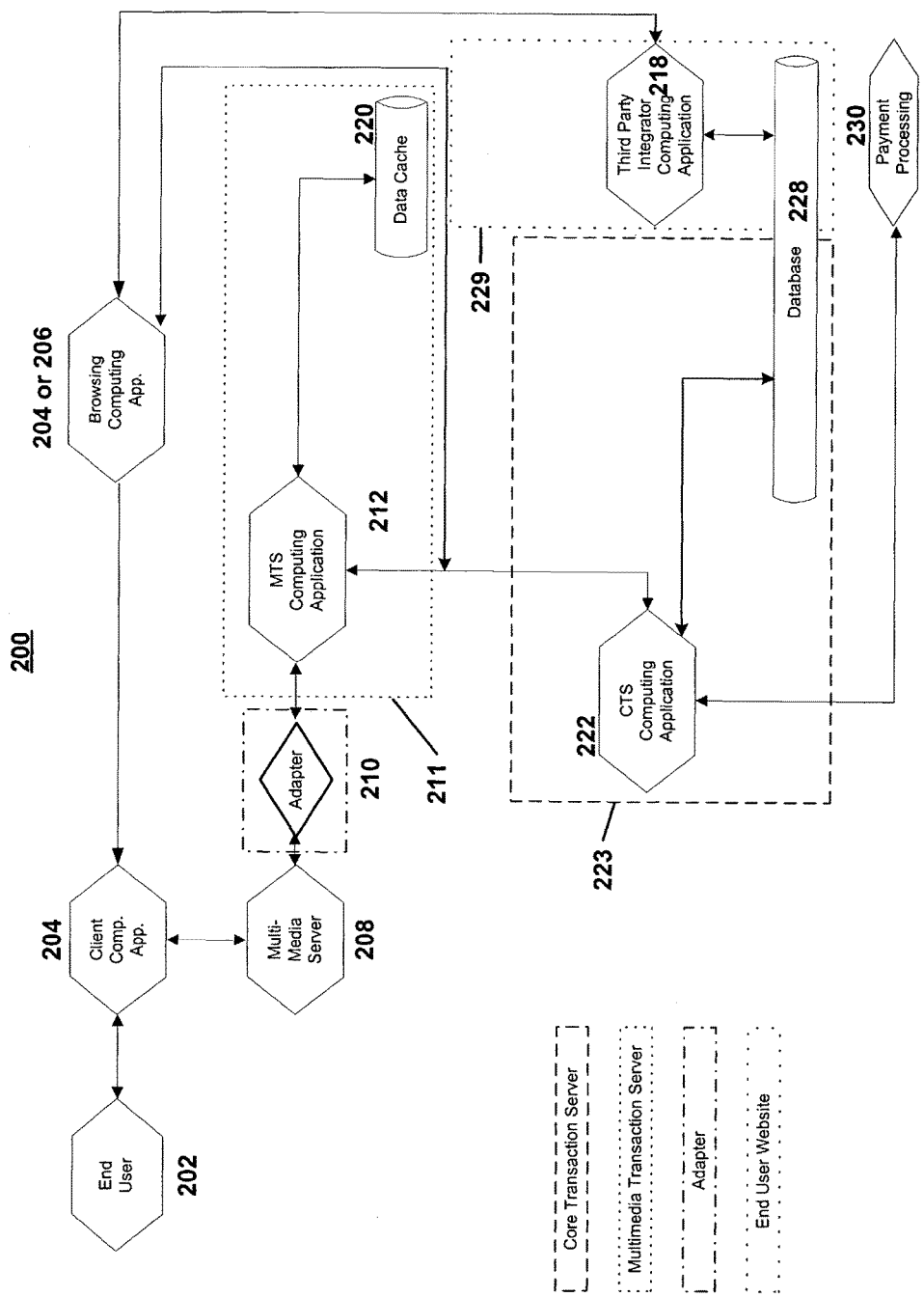
FIG. 2A is a general block diagram showing the interaction between exemplary computing environment components in accordance with an illustrative implementation of the herein described systems and methods.
Figure 2B:
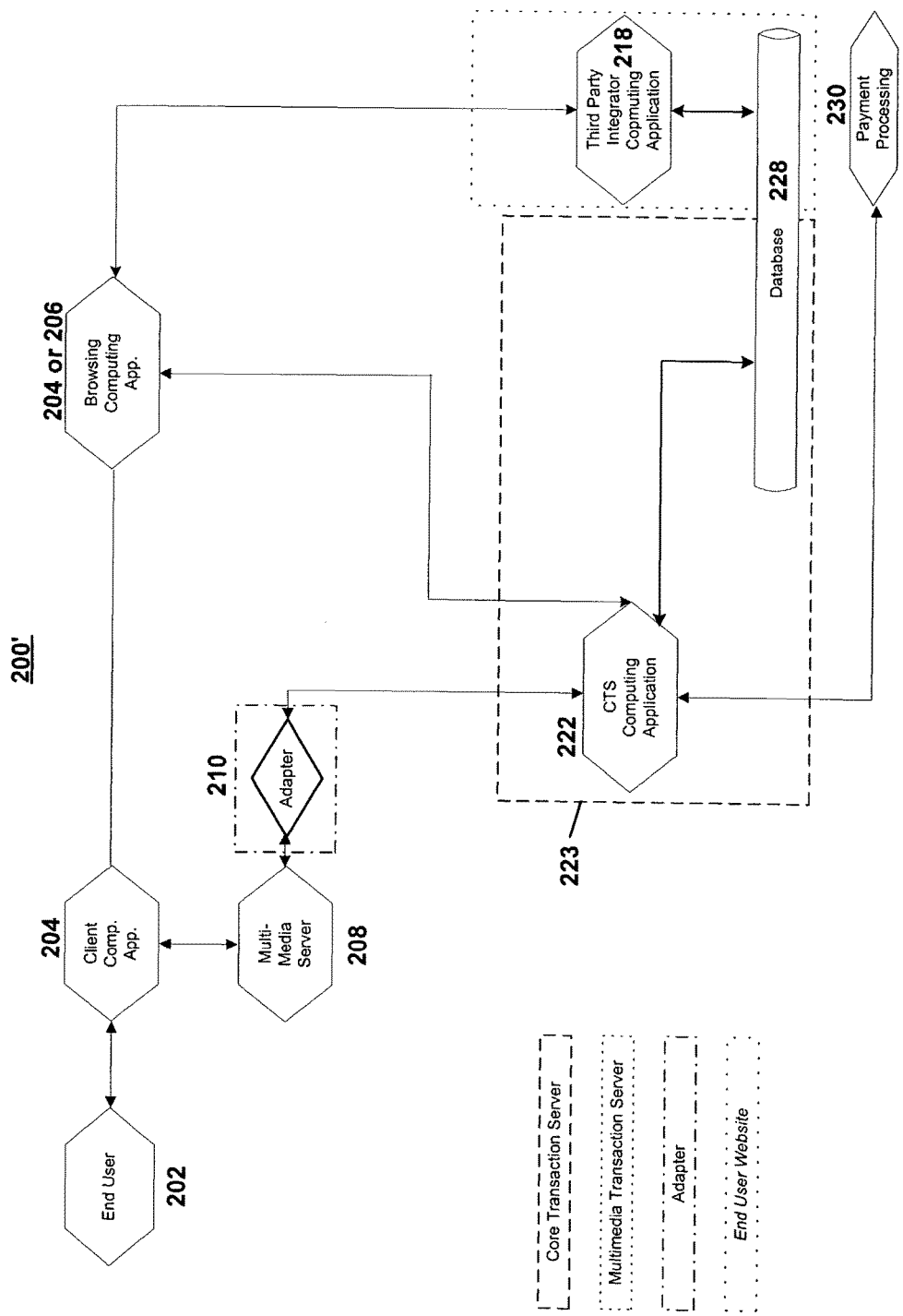
FIG. 2B is a detailed system diagram showing the interaction between exemplary computing environment components in accordance with an alternative illustrative implementation of the herein described system and methods.
Figure 2C:
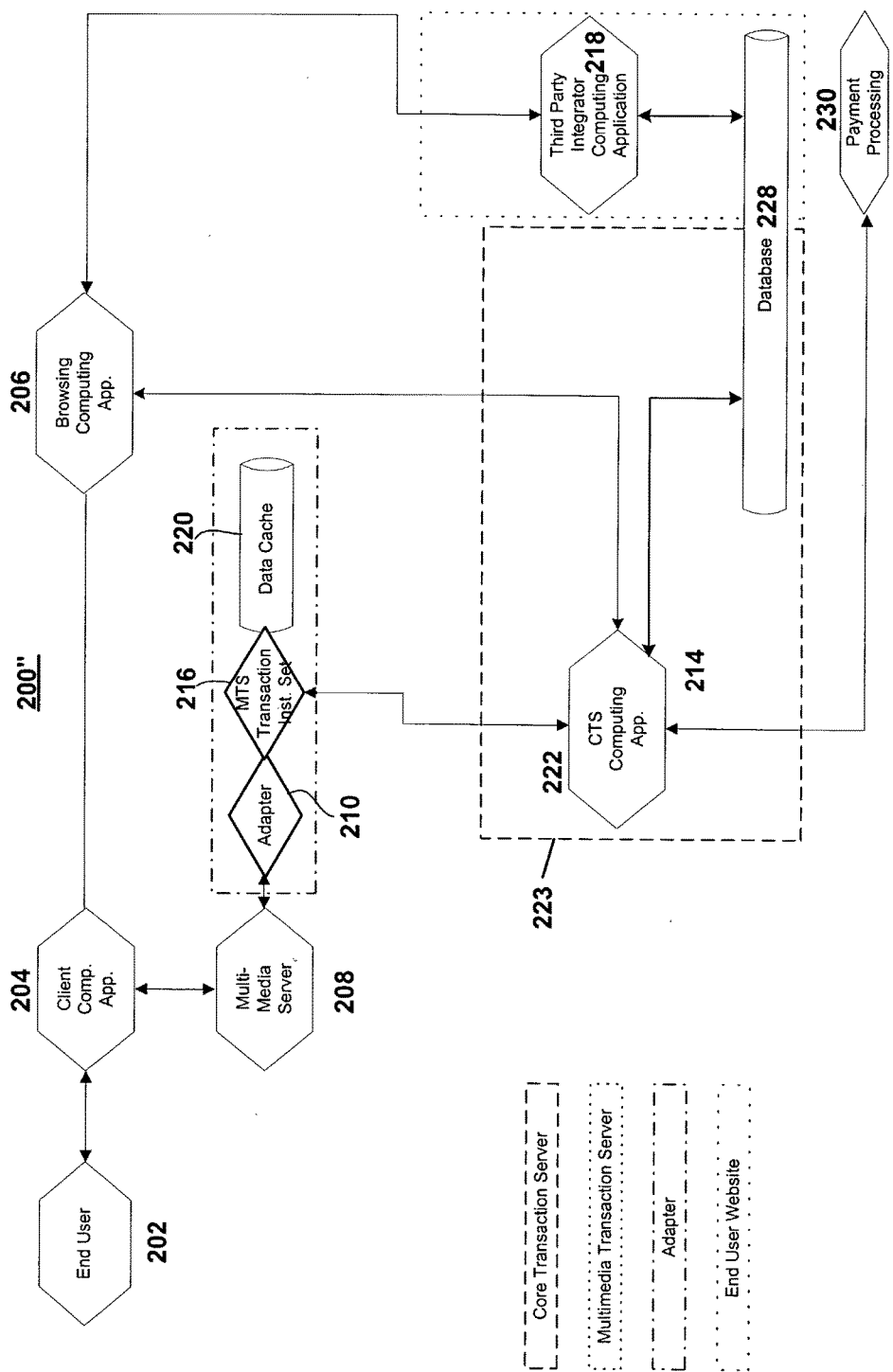
FIG. 2C is a detailed system diagram showing the interaction between exemplary computing environment components in accordance with an alternative illustrative implementation of the herein described system and methods.

FIGS. 2-2C are detailed block diagrams of an exemplary systems operating the described methods of the present invention. As is shown in FIG. 2, rule circumvention system environment 201 comprises participating user 202, computing environment operators 203, rule circumventions 205, rule circumvention transaction system 200, and payment reconciliation 230. In operation, participating users operating in a computing environment (not shown) interact with rule circumvention system 200 to obtain rule circumventions 205 which are granted by computing environment operators 203 and, for which, payment may be reconciled by payment reconciliation process 230. In an exemplary implementation, computing environment operators 203 may comprise game developers that offer a computer game to participating users 202. Within the computer game, computing environment operators 203 have integrated therein rule circumvention transaction system 200 which allows the participating user, for a fee, to circumvent one or more of the rules of the computer game. The rule circumventions 201 are then transacted between the participating users 202 and the computing environment operators 203 through rule circumvention transaction system 200 (e.g. rule circumvention transaction system 200 may operate to have users establish user accounts such that when a specific rule circumvention is desired (e.g. adding more ammunition), the rule circumvention can be transacted in real time as the participating user is navigating through the computing environment) and payment is reconciled by payment reconciliation process 230. It is appreciated that although payment reconciliation process 230 is shown to exist as a separate process from the rule circumvention transaction system 200, that such description is merely exemplary as payment reconciliation (as is seen in FIGS. 2A-2C) may be part of rule circumvention transaction system 200. Likewise, it is appreciated that although rule circumventions 205 are shown to exist separate and independent from rule circumvention transaction system 200, that such description is merely exemplary as rule circumventions may be a part of rule circumvention transaction system 200.

FIG. 2A shows a general block representation of the interaction of components of an exemplary rule circumvention system. As is shown, rule circumvention system 200 comprises a computing application 206, content server 211, core transaction server 223, and payment processing 230. Computing application 206 cooperates with content server 211, having at least one instruction set for integrating rule circumvention content in computing application 206. Also, computing application 206 cooperates with core transaction server 223, having at least one instruction set to instruct core transaction server 223 to transact instances where rule circumventions are initiated and executed in computing application 206. In transacting rule circumventions, core transaction server cooperates with content server 211. As is shown, core transaction server 223 also cooperates with payment processing module 230 to reconcile payment by end user 202 for transacted rule circumventions.

In operation, end user operates computing application to navigate through a computing environment (not shown). In navigating through the computing environment (e.g. computer game), the participating user may desire to circumvent one or more of the rules of the computing environment. In this instance, computing application cooperates with content server 211 to obtain rule circumventions. When initiated and executed, the instances of rule circumventions are transacted by core transaction server 223 cooperating with computing application 206 and content server 211. The transactions are then reconciled by payment processing module 230.

FIG. 2A' shows a first exemplary detailed implementation of computing environment rule circumvention system. As shown in FIG. 2A', rule circumvention system 200 comprises client computing application 204, browsing computing application 206, multimedia server 208, adapter 210, multimedia transaction server 211, core transaction server 223, third party integrator computing application 229, database 228, and payment processing engine 230. Core transaction server 223 further comprises core transaction server (CTS) computing application 222. Multimedia transaction server 211 further comprises multi-media transactions server computing application 212 and data cache 220.

In an exemplary implementation, CTS computing application 222 may comprise (but is not shown) an Internet information server transaction server, Internet information server Web server, internet server application program interface, CTS login dynamic link library (DLL), and stored procedures). MTS computing application 212 may comprise (but is not shown) an Internet information server, ISAPI, multimedia transaction server (MTS DLL), stored procedures. Lastly, third party integrator computing application may comprise Internet information server Web server, ISAPI, Web transaction DLL, and stored procedures. It is appreciated, however, that the exemplary implementation described herein is merely exemplary, as the systems and methods disclosed herein may operate on various computing environment platforms including but not limited to, JAVA, LINUX, WINDOWS® (and it's family of products), and UNIX computing environment platforms.

In operation, participating user 202 cooperates with client computing application 204 to perform functions related to the transaction of computing environment rule circumventions (not shown). Exemplary functions include but are not limited to creating user accounts for use when transacting computer game rule circumventions and/or interactive advertisement interactions, requesting computer game rule circumventions and/or interacting with interactive advertisements, executing computer game rule circumventions and/or interactive advertisements, and providing payment (e.g. through a user account) for executed computer game circumventions and/or for requested products and/or services from interactions with interactive advertisements. Client computing application 204 cooperates with multimedia server 208 to realize one or more of these described functions. Multimedia server 208 comprises a computing environment or a portion of a computing environment capable of processing data representative of multimedia content. Also, multimedia server 208 cooperates with multimedia transaction server 211 through adapter 210. Adapter 210 serves as an interface to translate data in required protocols between multimedia server 208 and multimedia transaction server 211.

In the provided implementation, data is communicated between multimedia transaction server (MTS) 211 and multimedia server 208 through adapter 210. Data arriving MTS server 211 is processed by MTS computing application 212 and communicates data to cooperating system 200 components. Once processed, some of the data may be stored in cooperating data cache 220, or alternatively be communicated between the MTS computing application 212 and core transaction server 223. Within, core transaction server 223, communicated data from multimedia transaction server 211 is further processed by CTS computing application 222. A portion of the core transaction server data is communicated to database 228 through the CTS computing application 222. Alternatively, data processed by core transaction server 223 may be further processed by payment processing operation 230.

Moreover, core transaction server 223 may serve to assist in retrieving desired login information (requested by cooperating web browser 206 as part of a user login authentication and verification process). In this context, the CTS computing application is invoked to cooperate with database 228 to communicate data to and from database 228. This requested data is then communicated browsing computing application 206.

Also, rule circumvention system 200 comprises third party integrator computing environment 229 having third party integrator computing application 218. Third party integrator computing application 218 is partly populated by data retrieved from database 228. This data is presented to end user 202 through browser computing application 206 cooperating with client computing application 204.

In operation, end user 202 may employ system 200 to establish an account for use when transacting rule circumventions within a computing environment. Moreover, system 200 provides the rule circumvention content for integration within a given computing environment. In the illustration provided, the end user 202 has access to client computing application 204 cooperating with browser computing application 206 and multimedia server 208. The multimedia client has the capability, inter alia, to execute a computer game having therein rule circumventions. End user 202 can establish an account on rule circumvention system 200 by providing data through client computing application 204 cooperating with browsing computer application 206. Specifically, end user 202 may cooperate with one or more data input interface devices (e.g. keyboard, mouse, graphic tablet, voice recognition device, or other similar data input device—not shown) to provide data representative of a desired account to client computing application 204 cooperating with browsing computing application 206. Account data is then communicated by browsing computing application 206 via some communication protocol by the third party integrator computing application 218. The account information is stored in database 228 for use when transacting rule circumventions within a desired computing gaming environment. Included with the provided end user account information is user contact information and data representative and for use in payment processing for executed entertainment enhancement options transactions. Exemplary payment processing data includes but is not limited to credit card account information, Internet payment processing information (e.g. PAYPAL), bank information (e.g. online bank payment processing) and other similar electronic payment processing options data. Moreover, the end user (and/or content manager or entertainment enhancement option manager) may access end user account information using third party integrator computing application 218 to access desired account information stored in database 228.

An account established, end user 202 may employ entertainment rule circumvention system 200 to transact and execute desired rule circumventions. In this context, the end user interacting with a computer game being displayed through client computing application 204 by multimedia server 208 may engage one ore more integrated rule circumventions integrated within the computer game. In operation, the integrated rule circumvention is displayed to the end user 202 by multimedia server 208 through client computing application 204. When the desired entertainment option is engaged, a request is sent by multimedia server 208 to multimedia transaction server 211 through adapter 210. Multimedia transaction server 211 first processes the request by determining whether the participating user has an established account on the entertainment enhancement options transaction system 200.

Once, the account information is verified (and/or created), rule circumvention system 200 proceeds to perform processing to transact the desired rule circumvention for the end user. Specifically, core transaction server 211 invokes CTS computing application 222 to cooperate with database 228 to obtain data representative of a rule circumvention transaction. One obtained, the rule circumvention transaction information is communicated to the multi-media transaction server 211 through core transaction server 223. Specifically, MTS computing application 212 gathers the rule circumvention transaction information for communication through adapter 210 to multi-media server 208. It is at the adapter 210 that the appropriate triggers and flags are initiated and set that allow for the rule circumvention to occur with the computing environment supported by multi-media server 208. At multi-media server 208, additional content having the rule circumvention information and rule circumvention transaction information is provided to client computing application 204. As described previously, client computing application 204 is used to display computing environment content information (e.g. gaming content) to participating end users 202.

Moreover, rule circumvention system 200 allows end user 202 to interact with multimedia client 204 to simultaneously interact with a particular computing environment (e.g. a computer game) while verifying and updating user account information. In this context, end user 202 cooperated with client computing application 204 which in turn communicates with browsing computing application 206 and third party integrator computing application 229 to verify and/or modify user account information on database 228. In doing so, rule circumvention system 200 allows users to have real time control over their account while the computing environment is being navigated. With this ability, participating users 202 are provided with significant flexibility and control over the incidence of engaging in rule circumvention. Specifically, an end user navigating through an environment may choose to engage a particular rule circumvention only to find that their account is past due or is underfunded. The end user 202 is not left in the lurch, but rather is free to, while navigating through the computing environment, update their account information to bring it to a funded state such that the desired rule circumvention may be engaged.

As described, when a rule circumvention is transacted, the actual payment for the transacted rule may be reconciled at various times depending on the configuration of the payment processing. As shown in FIG. 2A', payment processing 230 cooperated with core transaction server 223 to obtain transaction information for participating users who have engaged in rule circumvention. Payment processing module 230 comprises at least one instruction set for processing of payments according to some predefined payment processing methodology (e.g. credit card transaction, debit card transaction, PAYPAL, etc.). Such payment processing may occur in real time as participating user 202 engage in rule circumventions or may be configured to perform batch payment processing such that payment processing is performed at a subsequent time to when a participating user 202 engaged in a rule circumvention.

It is appreciated, however, that the inventive concepts described herein extend beyond the instance where a computer game is played on a web browser computing application, rather, the inventive concepts described herein can be implemented in various computing application executing in various computing environments (networked and non-networked) having varying configurations. Moreover, it is appreciated that although the example provided in FIG. 2A' contemplates the use of a client computing application 204, browsing computing application 206 and, a third party integrator computing application 229, that such is merely exemplary as these computing application may exist in the same computing application (not shown). In the example provided, this configuration of computing applications addresses the instances in which the computing environment operator (e.g. game developer) operates a computing application independent of the end users browsing computing application (e.g. web browser) which both are independent of a third party integrator computing application (e.g. rule circumvention transaction integration partner).

FIG. 2B shows an alternate implementation of rule circumvention system 200'. As shown in FIG. 2B, the operation of rule circumvention system 200' dos not include multimedia transaction server 211 (as is seen in rule circumvention system 200 of FIG. 2A'). In this context, multimedia server 208 no longer communicates through the adapter 210 and multimedia transaction server 211 when offering and receiving data from core transaction server 223. With the absence of multimedia transaction server 211, more transaction and rule circumvention processing is left to be performed on adapter 210 and core transactions server 223.

FIG. 2C shows a second alternate implementation of rule circumvention system 200. As is shown in FIG. 2C, rule circumvention system 200" does not include multimedia transaction server 211 (of rule circumvention system 200 as is seen in FIG. 2B). Instead, adapter 210 cooperates with MTS instruction set 216 which in turn cooperates with data cache 220. The remaining operations as described in FIG. 2A' remain unchanged. In this context, without multimedia transaction server 211, more operations performed by multimedia transaction server 211 are offloaded to core transaction server 223 and to adapter 210.

Figure 2D:
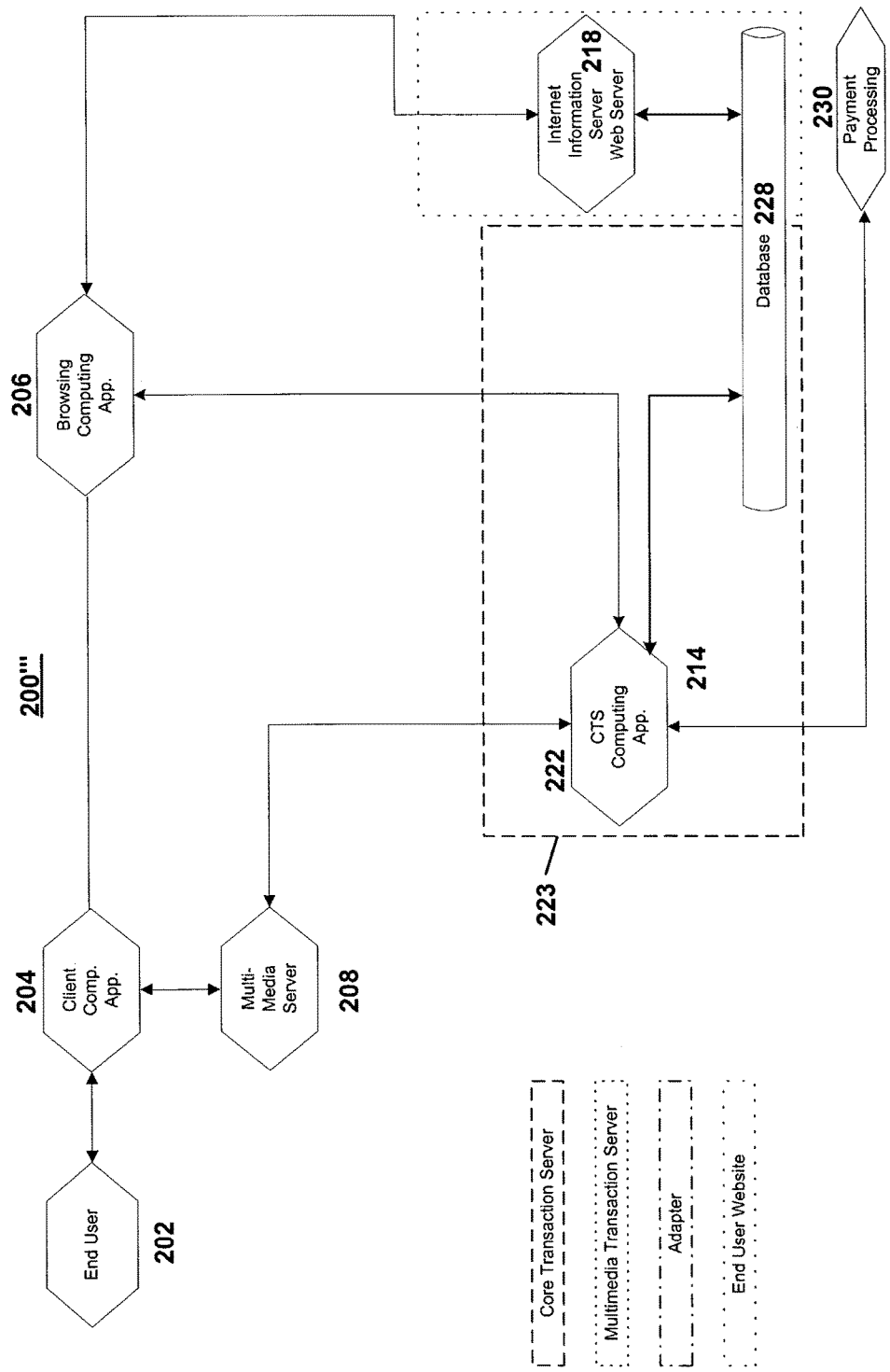
FIG. 2D is a detailed system diagram showing an alternative exemplary interaction between exemplary computing environment components in accordance with an alternative illustrative implementation of the herein described system and methods.
Figure 2D:
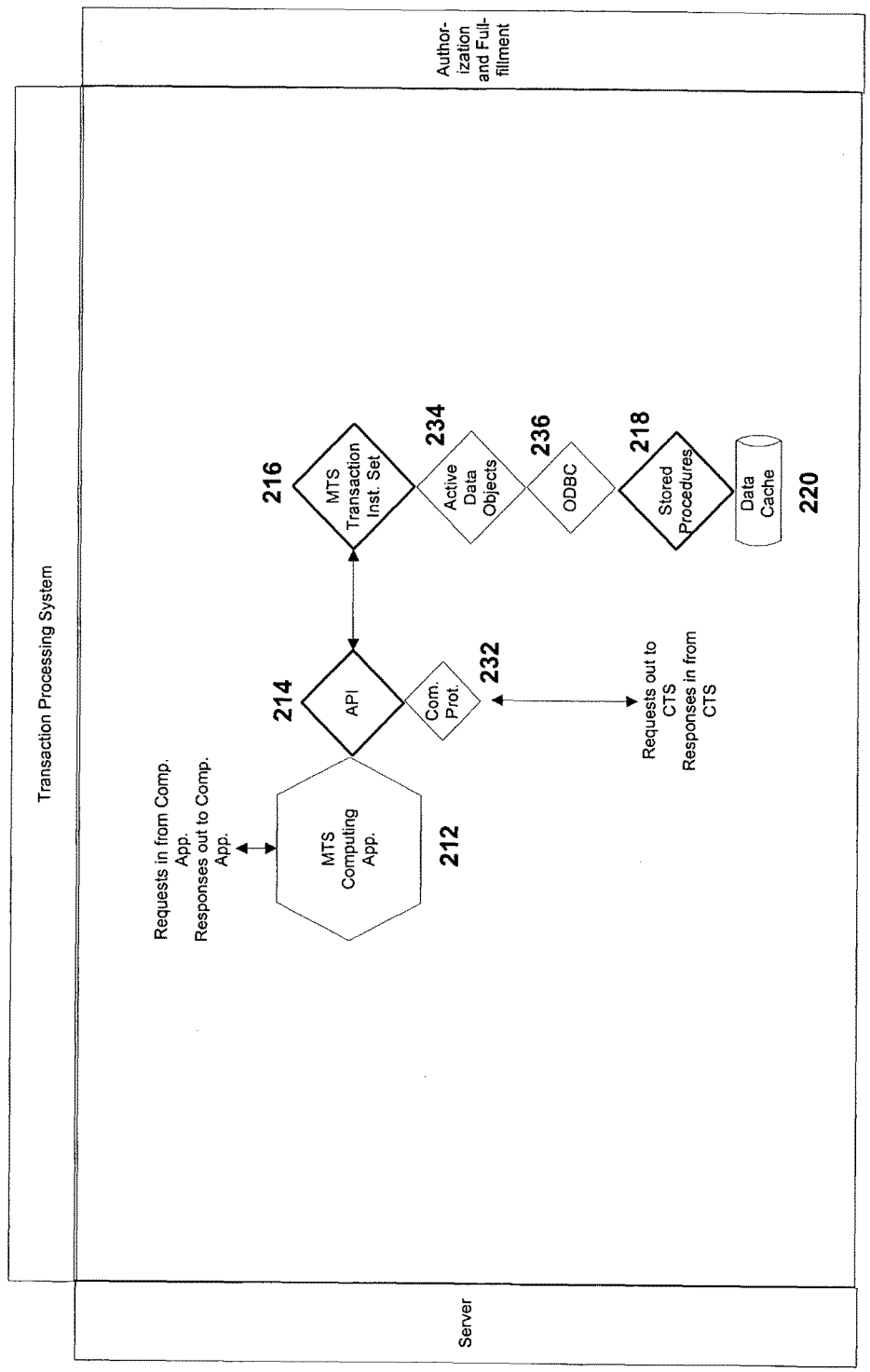

FIG. 2D shows a third alternate implementation of rule circumvention system 200. As is shown in FIG. 2D, rule circumvention system 200''' does not include multimedia transaction server 211 (of rule circumvention system 200 as is seen in FIG. 2B) and does not include adapter 210. Instead, core transaction server 223 cooperates directly with multi-media server 208 to perform functions described above. The remaining operations as described in FIG. 2A' remain unchanged. In this context, without multimedia transaction server 211 and adapter 210, more operations performed by multimedia transaction server 211 and adapter 210 are offloaded to core transaction server 223 and to adapter multimedia server 208.

FIGS. 2D' and 2E shows more detailed description of the data flow between the cooperating components of rule circumvention systems 200, 200', 200", 200'''. As shown in FIG. 2D, MTS computing application 212 communicates with other system components (not shown) via a native communications protocol. MTS computing application 212 cooperates with application program interface (API) 214 which in turn communicates with MTS transaction instruction set 216. In addition, API 214 cooperates with communications module 232 to communicate data to and from core transaction server (not shown). MTS transaction instruction set 216, in turn, cooperates with Active Data Objects 234 which cooperates with ODBC 236. ODBC, in turn, cooperated with stored procedures 218, which in turn cooperates with data cache 220.

FIG. 2E, shows the data flow and cooperation of components to realize communication between the adapter and the multimedia transactions server (not shown). As shown, application interface 238 cooperates with communications protocol module 232 to realize MTS communications. The application interface 238 receives and communicates information from the adapter and correspondingly, the communication protocol module 232 communicates information to and from the multimedia transactions server or core transaction server.

Figure 3:
FIG. 3 is a screen shot of an exemplary gaming computing application having therein incorporated the rule circumvention features of the herein described system and methods.
Figure 4:
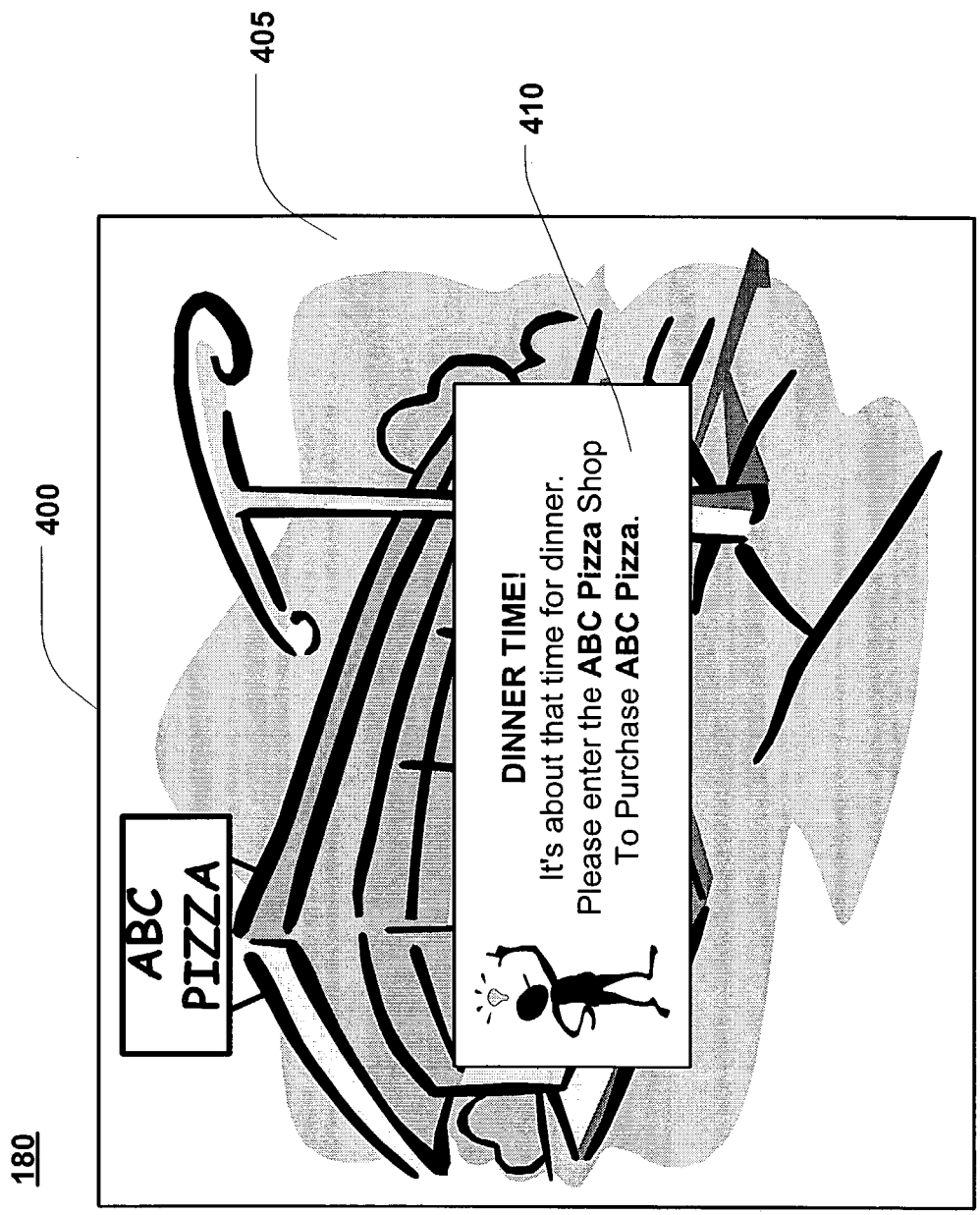
FIG. 4 is a screen shot of an exemplary computing application having therein incorporated integrated advertisement features of the herein described system and methods.
Figure 4A:
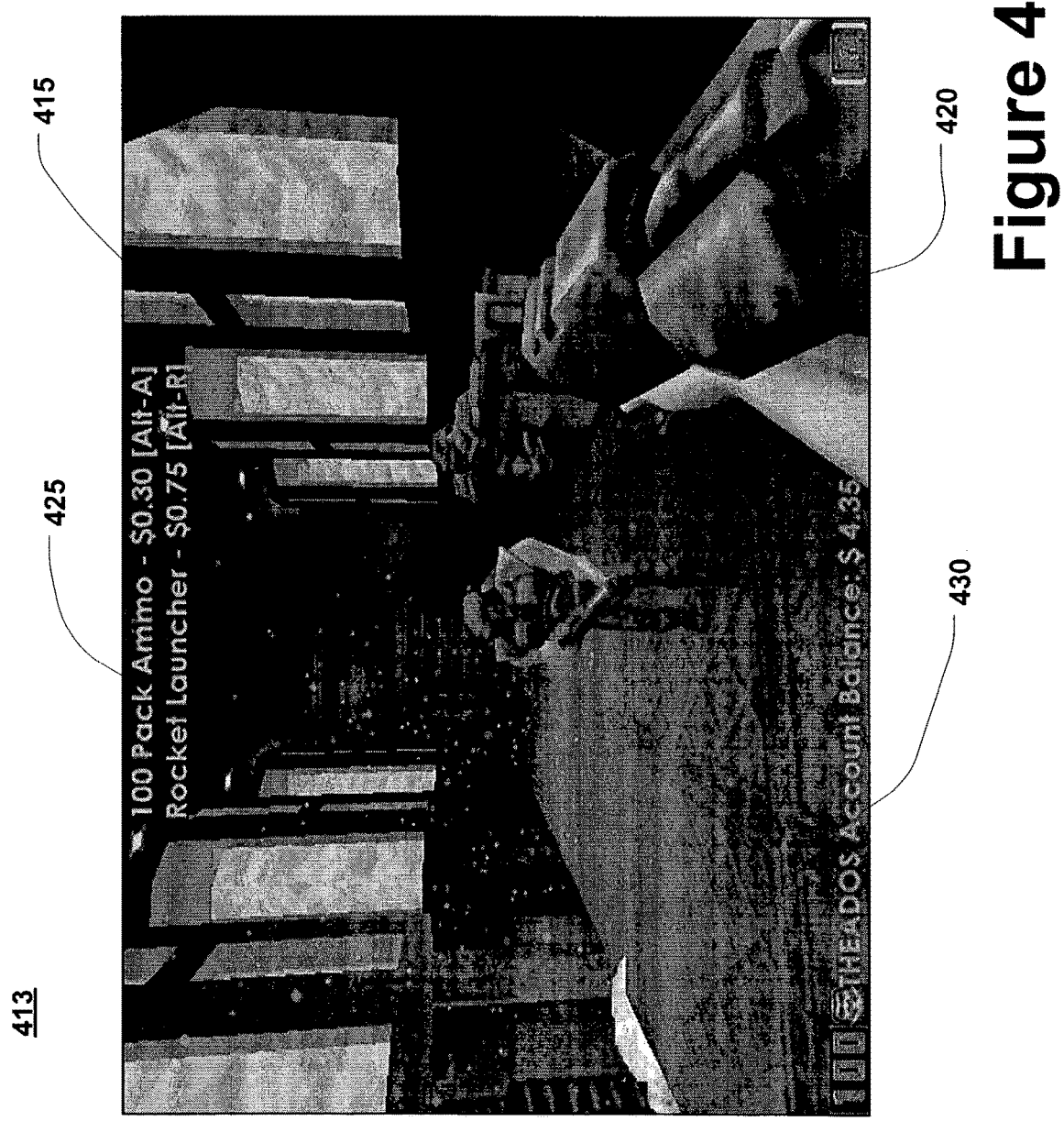
FIG. 4A is a screen shot of an exemplary computing simulation application showing the real-time transaction in accordance with the herein described system and methods.

FIGS. 3, 4, and 4A illustrate screen shots that display various features of the computing environment rule circumvention system. As shown in FIG. 3, rule circumvention system may be incorporated in computing application 180 displaying an interactive game through gaming pane 300. Gaming pane 300 may comprise gaming content 305 and rule circumventions dialog box 310. In operation, a user may be prompted by gaming computing application to secure a variety of rule circumventions. In the example shown, dialog box 310 may warn the user that he/she is low in ammunition in the interactive search and destroy game 305 that is being navigated. A user may choose to purchase additional ammunition and proceed, or alternatively, proceed without securing any rule circumventions. Conventionally, this rule circumvention would not be offered to garners. Rather, garners would be forced to proceed with low ammunition using skill to advance in the game. Typically, gamers would proceed with low ammunition only to be defeated. The user maybe relegated to start the game from the very beginning, rendering all of his/her invested time moot.

Alternatively, the herein described systems and methods may offer users interactive advertisements (which as described above may in themselves act as rule circumventions) by which users can purchase a variety of products or services. These advertisements may be integrated within a number of computing applications in accordance to the context of the computing application. For example, in a simulation role playing game, real world products and/or services advertisements may be integrated in the game's landscape such that a user may interact with the cyber world advertisements to transact real world products and/or services. As shown in FIG. 4, the present invention may be employed by computing application 180 supporting a cyber environment having display pane 400. Display pane 400 may comprise interactive content 405 and interactive content dialog box 410. In operation, a user may be engrossed in a role playing computing application game for hours not realizing that the dinner hour is soon upon him/her. In the game, the user may be required to navigate through city streets and neighborhoods having storefronts and other real world constructs. As the user passes by a cyber realm storefront, ABC Pizza, dialog box 410 may appear to the user of computing application 180 providing a friendly reminder that dinner time is approaching. The user may proceed to enter the store in the cyber world and place an order for a real world pizza. The system of the present invention would communicate the order to the appropriate parties and the real world product would be delivered to the user. The user is now given the ability to transact real world products through the cyber realm storefront. The systems and methods described herein are not limited to communicating with participating users using merely dialog boxes, but rather is capable of communicating with participating users in any manner supported by the computing environment, including but not limited to, heads up displays, sound, video, or any other integrated and/or stand-alone medium presentable and operable by the participating user. Moreover, the interactive advertisement offering is not limited to the provided example, but rather, can be triggered by various conditions and scenarios.

FIG. 4A shows a screen shot of an exemplary computing simulation application 413 describing the integration and real-time transaction features of the herein described systems and methods. As shown, screen shot 415 comprises simulation content 420, rule circumventions information 425, and transaction information 430. In operation, a participating user may operate computing simulation application 413 to interact with simulation content 420. Computing simulation application 415 may be configured that is has access to rule circumventions content provider computer server 10a (of FIG. 1B) such that rule circumventions may be offered through computing application 413 to the participating user while interacting with computing application 413. In the example shown, the game is directed to a "shot-em up" type game where the participating user is called upon to slay unworldly beasts using a variety of weaponry. As the participating user runs low on ammunition (or some other condition), rule circumvention information 425 is displayed to offer rule circumventions to the participating user. As such, the rule circumvention is integrated into computing application 413. Rule circumventions information 425 comprises information about the possible rule circumventions and the cost of the rule circumventions. In addition to the rule circumventions information 425, transaction information 430 is offered to the participating user to inform him/her of their outstanding balance. The participating user may elect to accept the offered rule circumvention, using rule circumvention information 425 and transaction information 430 to help him/her in their decision, to enhance his/her interaction with computing application 413.

It is appreciated that although the systems and methods have been described in context of a computer game, the inventive concepts described herein extend beyond this singular exemplary implementation as they are applied to any computing environment having rules such.

Figure 5:
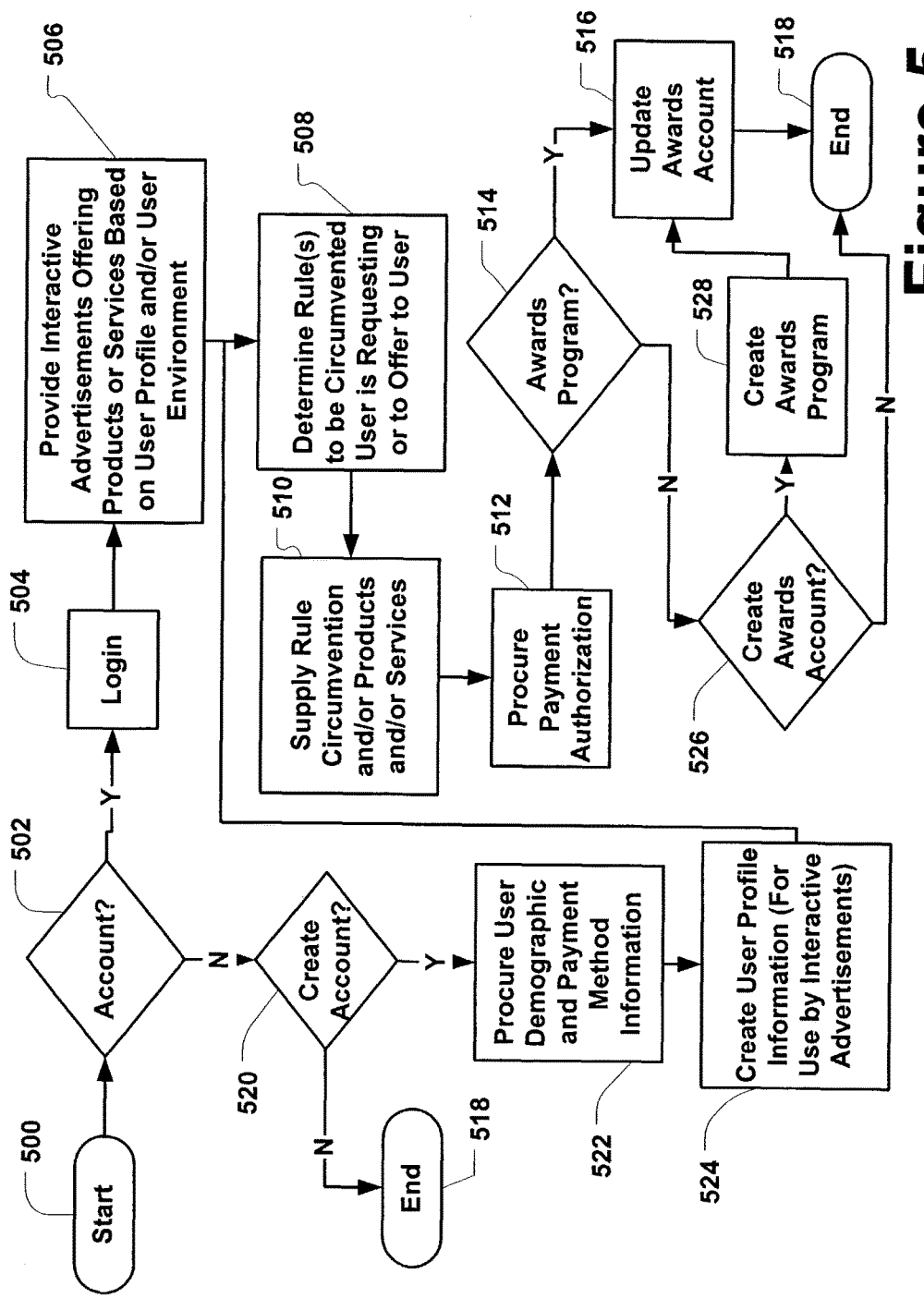
FIG. 5 is high level flow diagram of the processing performed by the herein described system and methods when performing rule circumvention and integrated advertisement operations.

FIG. 5 shows the processing performed when a participating user establishes an account for us with the herein described rule transaction system. As shown, processing begins at block 500 and proceeds to block 502 where a check is performed to determined if the participating user has an account. If the user does not have an account, processing proceeds to block 520 where an a check is performed to determine if an account is to be created. If it is not, processing terminates at block 518. However, if the user wishes to establish an account, processing proceeds to block 522 where demographic and payment method information is gathered and a user profile is created at block 524. From there processing proceeds to block 506.

Alternatively, if at block 502, it is determined that a user has an established account, processing proceeds to block 504 where the user is prompted to enter in their login information. From there processing proceeds to block 506 where interactive advertisements are offered to the participating users. The rules to be circumvented are then gathered at block 508 and provided to the user as he/she navigates through the computing environment at block 510. Payment authorization is procured at block 512 in the instance a rule circumvention is executed. A check is then made at block 514 to determine if the user belongs to an awards program. If the user is subscribed to an awards program, the awards account is update at block 516 and processing then terminates at block 518. However, if at block 514, it is determined that the user does not belong to an awards program, processing proceeds to block 526 where a check is made to determine if an awards account is to be created. If it is not, processing terminates at block 518. However, if an awards program account is to be created, processing proceeds to block 528 where an awards account is created and processing proceeds to block 516 and proceeds there from.

It is noted that the order of the offerings (e.g. interactive advertisement offering then rule circumvention offering, etc.) to the user is merely exemplary as the order of offerings is dependent on how the computing environment is navigated.

Figure 5A:
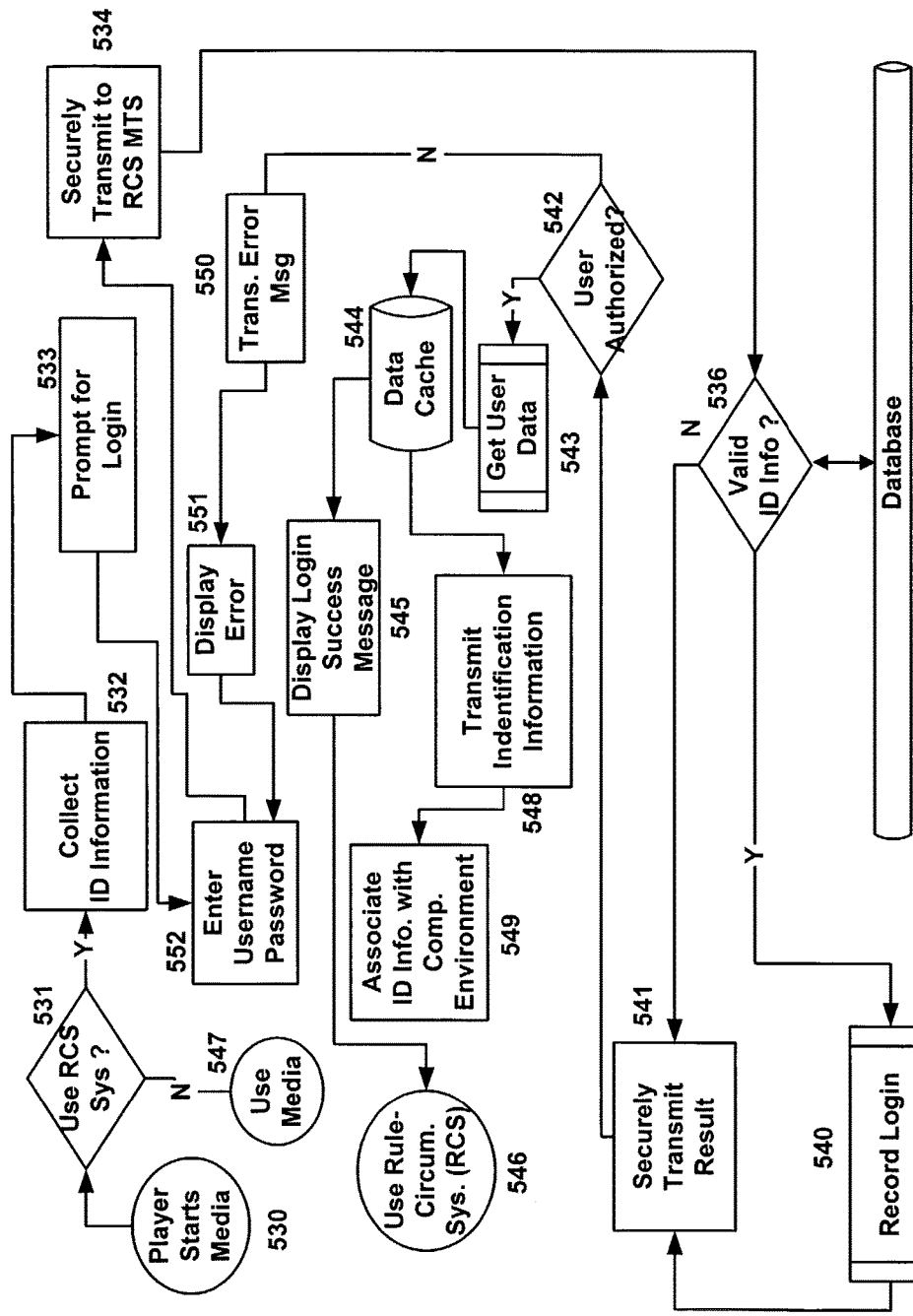
FIG. 5A is a detailed flow diagram of the processing performed to authenticate a participating user and to create a session for an authenticated participating user in accordance with the herein described systems and methods.

FIG. 5A shows the processing performed when a participating user engages the rule circumvention system (RCS) to circumvent one or more rules of a computing environment having rule circumvention integrated therein. As shown, processing begins at block 530 and proceeds to block 531 where a check is performed to determine if the rule circumvention system is to be invoked. If the rule circumvention system is not to be used, processing proceeds to block 547 wherein the computing environment is availed to the participating user with rule circumventions. However, if the rule circumvention system is to be engaged at block 531, processing proceeds to block 532 where identification information is collected (identification information may include a user identifier (e.g. GameUserID), computing environment identifier (ProviderID), and an operation identifier (Context ID)) and received. From there, processing proceeds to block 533 wherein the participating user is prompted to login into the rule circumvention system. User login information is received at block 552 and securely transmitted to the rule circumvention system's multimedia transaction server at blocks 534. A check is then made against the RCS database at block 536 to determine if the identification information provided is valid. If the identification information is valid, processing proceeds to block 540 where the user login is recorded. Processing then proceeds to block 541 where the results of the login are transmitted to the computing environment operator. However, if at block 536, the check returns a false answer, processing proceeds to block 541 and proceeds from there.

From there, processing proceeds to block 542 where a check is performed to determine if the user has been authorized to have access to one or more rule circumventions. If the user is authorized, processing proceeds to block 543 where data about the user who logged in is retrieved. The user data is then cached at block 544. From there, a login success message is displayed at block 545 and processing proceeds to block 546 wherein the participating user is provided access to the rule circumvention system. Also after block 544, identification information (e.g. media identifier—MediaUserID and session identifier—SessionID) are created at block 548 and associated with the computing environment at block 549.

However, if at block 542 the user is not authorized, processing proceeds to block 550 where an error message is transmitted to the participating user. The error is then displayed at block 551 and processing reverts to block 552 and proceeds there from.

Figure 5B:
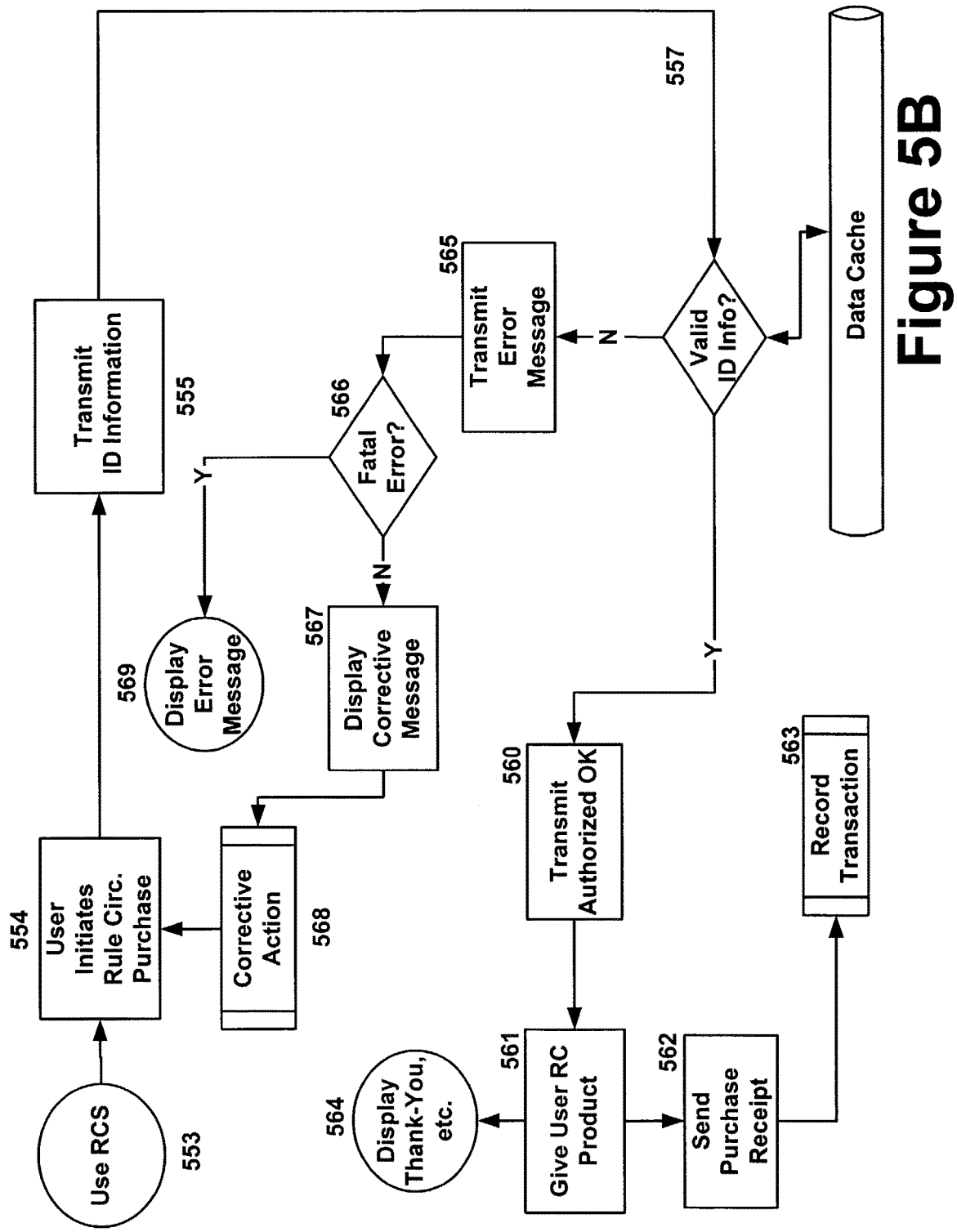
FIG. 5B is a detailed flow diagram of the processing performed when transacting the capability to circumvent a predefine rule in accordance with the herein described systems and methods.

FIG. 5B shows the processing performed after a participating user successfully logs onto the RCS and engages in a transaction for one or more rule circumventions. As shown, processing begins at block 553 and proceeds to block 554 where a participating user initiates a rule circumvention purchase. Processing then proceeds to blocks 555 where identification information (e.g. product information and session ID information) is transmitted to the RCS transacting module. From there a check is performed at block 557 to determine if it is valid identification information. If it is a valid, processing proceeds to block 560 where the an authorization is transmitted to the computing environment. The user is then provided the requested rule circumvention at block 561 and a confirmation message is displayed at block 564. In addition, a purchase receipt is provided at block 562 and the transaction is recorded at block 563 for subsequent processing (e.g. user account reconciliation and payment processing).

However, if at block 557, the check return a false result, processing proceeds to block 565 where an error message is transmitted to the participating user. A check is then performed at block 566 to determine if the error is fatal to the transaction. If the error is fatal, an error message is displayed and processing terminates at block 569. However, if the alternative proves to be true, processing proceeds to block 567 where a corrective message is displayed and corrective action (e.g. capitalization of under-funded user accounts) is performed at block 568. From there processing reverts to block 554 and proceeds there from.

FIG. 5C is a flow diagram of the processing performed when integrating an interactive advertisement in a computing environment. As shown, processing begins at block 570 wherein the RCS is invoked and proceeds to block 571 where a condition to offer interactive advertisements is met (e.g. participating user utilizes an area of the computing environment having interactive advertisements or other condition is met for the interactive advertisement transmission). Processing then proceeds to block 572 where identification information (e.g. session identifier and advertisement information) is transmitted to the rule circumvention transaction module. The rule circumvention transaction module is described above and is seen in FIGS. 2-2E. From there a check is performed against a data cache at block 573 to determine if the identification information is valid. In operation, the interactive advertisements may be stored in a data cache to optimize processing. If the identification information is found to be valid, processing proceeds to block 575 where one or more advertisements are selected for transmission to the participating user at block 576. In this context, the advertisement may be generated in real time depending on one or more conditions (e.g. user is known to like a particular recording artist) or selected from a library of advertisements, wherein the selection is performed using a selection algorithm dependent on various factors including but not limited to user preferences and demographics. The advertisement is provided to the user at block 577 and inserted into the user's computing environment at block 578 for display at block 579. In this step, the advertisement may also be formatted to one or more pre-determined formats for seamless integration into hosting computing environment. Also, from block 577, an advertisement delivery receipt is created at block 580 and the transaction is recorded at block 581 for subsequent processing (e.g. transaction reconciliation and advertiser billing for advertisement placing).

However, if at block 573, the check returns a false answer, processing proceeds to block 582 where the transaction is committed for subsequent processing. A notification is then sent of a bad advertisement condition or session is created at block 583 and an advertisement filler may be created and displayed at blocks 584 and 585.

Figure 5D:
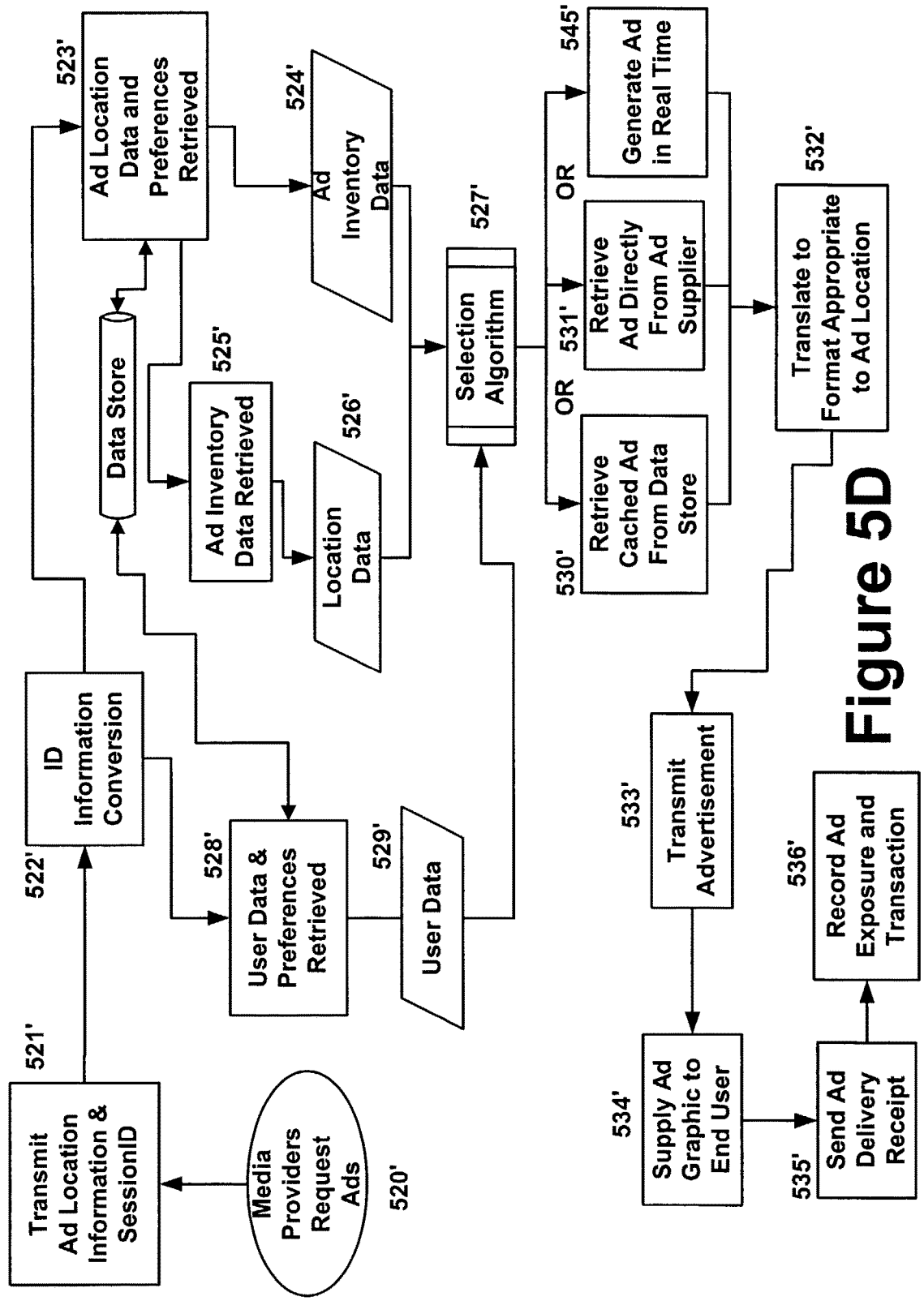
FIG. 5D is a detailed flow diagram of the processing performed when integrating interactive advertisements in accordance with the herein described systems and methods.

FIG. 5D shows the processing performed when delivering an interactive advertisement to a participating user. As shown, processing begins at block 520' and proceeds to block 521' where the advertisement location information and session identifier is transmitted to the rule circumvention transaction module. Processing then proceeds to block 522' where the identification information is converted (e.g. the session identifier is converted to the user identifier). From there processing follows two paths. Specifically, at block 528', user data and preferences are retrieved from a cooperating data store to generate user data 529' for use by selection algorithm 527'. Also, from block 522' processing proceeds to block 523' where the advertisement location data and preferences are retrieved from a cooperating data store. This data is delivered as advertisement inventory data to selection algorithm 527'. Additionally, advertisement location data 526' is retrieved from a cooperating data store at block 525' and is provided to the selection algorithm 527'.

The selection algorithm 527' processes the user data, location data, and advertisement inventory data to select an appropriate advertisement for delivery to the participating user based on these various criteria (e.g. user preferences, advertisement inventory, and location information—i.e. where the advertisement is to be placed in the computing environment). Once selected, the advertisement is ether retrieved a data store at block 530' or directly from the advertiser at block 531' or generated in real-time at block 545'. The selected, retrieved advertisement is then translated to a format appropriate to the advertisement location at block 532'. The formatted advertisement is then transmitted at block 533' for display to the participating user at block 534'. Once displayed, an advertisement delivery receipt is created at block 535' and the advertisement exposure is recorded at block 536'.

Figure 5E:
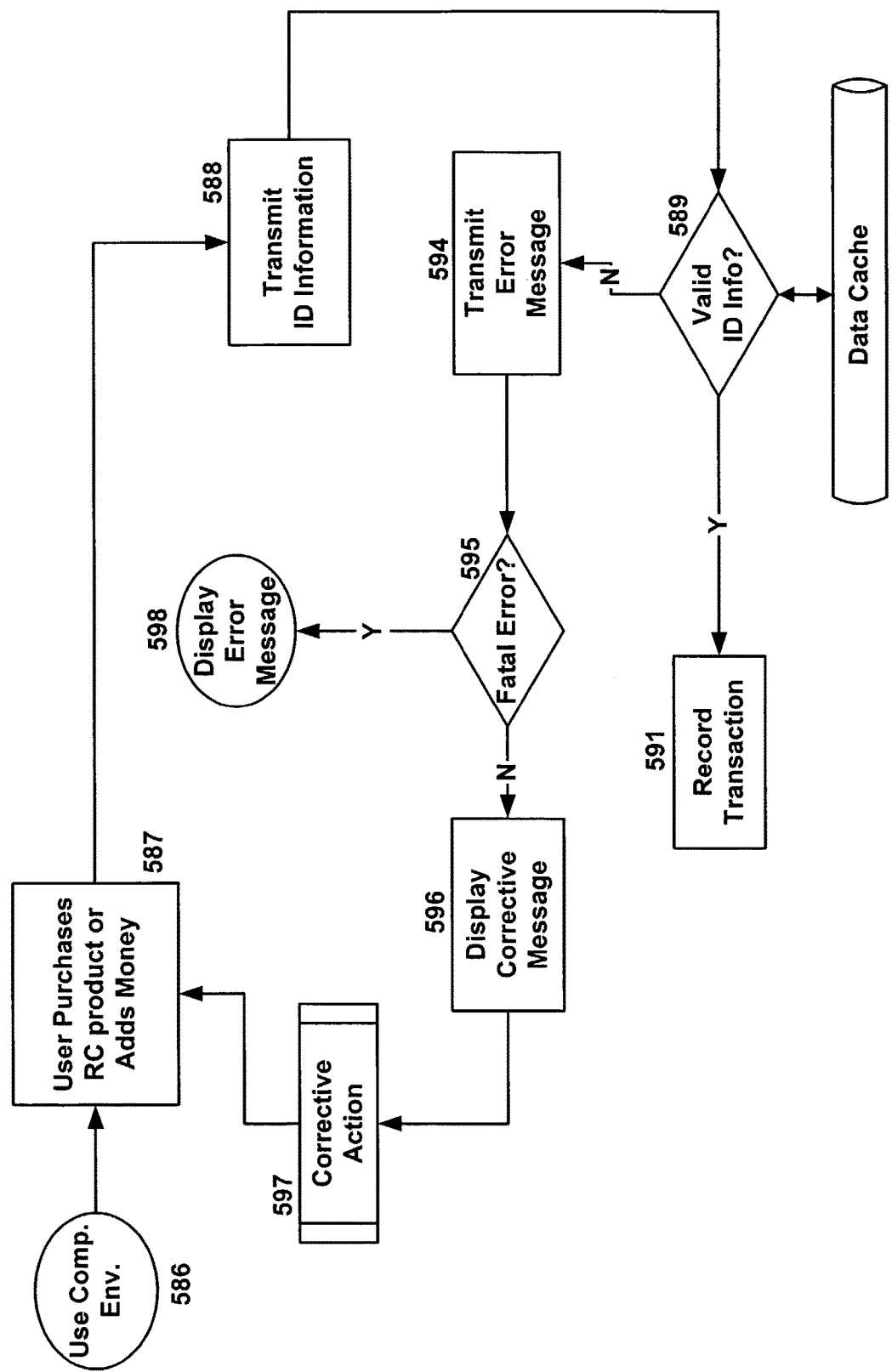
FIG. 5E is a detailed flow diagram of the processing performed a participating user updates their purchasing power to purchase capabilities to circumvent rules in accordance with the herein described system and methods.

FIG. 5E shows the processing performed when a user modifies their account (e.g. adds money to their account or makes a purchase off their account) on which the RCS operates. As shown, processing begins at block 586 and proceeds to block 587 where the participating user purchases a rule circumvention (RC) or adds a money to their account. From there processing proceeds to block 588 where the identification information (session identifier) is transmitted to the rule circumvention transaction module. A check is then performed at block 589 to determine if the identification information is valid. If the identification information is valid, processing proceeds to block 591 where the transaction is recorded (the transaction recording may include but is not limited to the generation of a balance that is transmitted for display and viewed).

However, if the checks at block 589 return a false answer, processing proceeds to block 594 where an error message is transmitted to the computing environment. A check is then performed by the rule circumvention system at block 595 to determine if the error stemming from blocks 589 is fatal. If the error is fatal, an error message is displayed and processing terminates. However, if the error is proven not to be fatal, processing proceeds to block 596, where a suggested corrective action message is displayed. Corrective action (e.g. entering in user name and password) is then taken at block 597. Processing then reverts to block 587 and proceeds there from.

FIG. 5F shows the processing performed when a participating user requests funds to be added by the rule circumvention system to their account. In operation, a participating user will offer some verification of funds (e.g. credit card, routing information for a bank account, etc.) on which the RCS operates to perform user account maintenance. As shown, processing begins at block 501' and proceeds to block 502' where the participating user requests additional money. Processing then proceeds to block 503' where identification information (e.g. user identifier and amount requested) is transmitted to the rule circumvention transaction module. A check is then performed at block 504' to determine if the identification information is valid. If it is, processing proceeds to block 506' where payment authorization commences. However, if at block 504', an error occurs such that the identification information is not validated, processing proceeds to block 508' and proceeds from there.

If at block 506' it is determined that payment is not properly authorized (e.g. credit card is rejected for requested amount), processing proceeds to block 508' where the result of the payment authorization is transmitted to the computing environment. However, if the payment authorization is successful, processing proceeds to block 507' where the purchase (i.e. additional funds are added to the account) is recorded and proceeds to block 508'. From block 508', processing proceeds to block 509' where a check is performed to determine if the purchase had been authorized. If it was authorized, processing proceeds to block 510' where the user's balance is retrieved and then cached at block 511'. A success message is transmitted to the participating user at block 512' and the updated balance is provided at block 514' for display at block 515'.

If, however, at block 509', it is determined that the payment is not authorized, processing proceeds to block 515' where an error message is transmitted. From there a check is performed to determine if the error that lead to a non payment authorization was fatal. If the error was fatal, processing proceeds to block 519' where an error message is displayed. However, if the error is not fatal a corrective message is displayed at block 517'. Corrective action (e.g. entering new user information), is then performed at block 518'. From there, processing reverts to block 502' and proceeds there from.

Figure 5G:
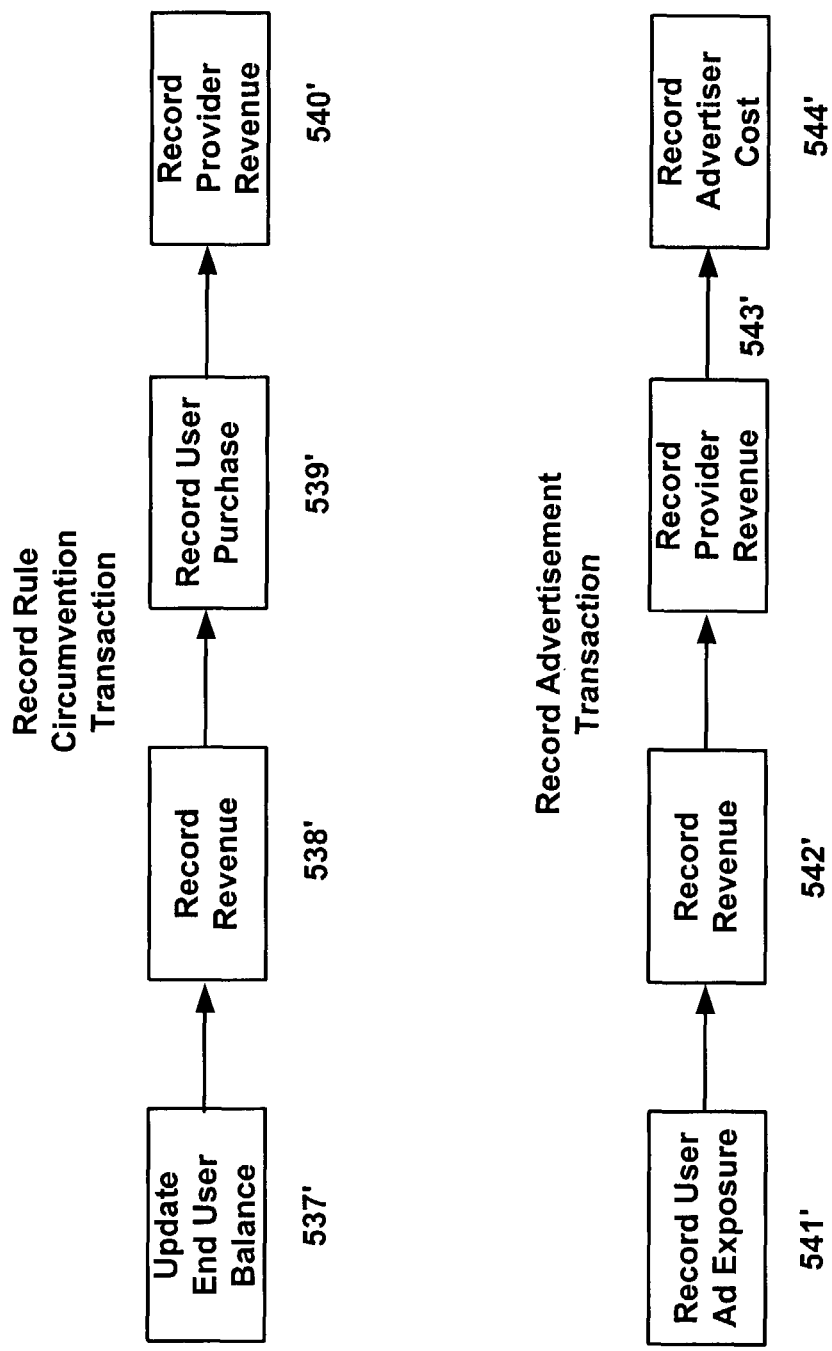
FIG. 5G is a flow diagram of the processing performed to track relevant data surrounding the transaction of rule circumvention capabilities and interactive advertisements.

FIG. 5G shows the processing performed when reconciling user accounts and advertisement usage for rule circumvention events. The reconciliation of such accounts on rule circumvention events provides computing operators (e.g. game developers) and their rule circumvention transaction integration partners with information representative of rule circumvention usage and revenue generated from the transaction of such rule circumvention events. As shown, in the context of updating participating user balances, processing begins at block 537' where the participating user balance is updated to show the execution of at least one rule circumvention. From there, processing proceeds to block 538' where the revenue from such rule circumvention transactions are recorded. The participating user purchase is then recorded at block 539'. Processing then proceeds to block 540' where the integration partner revenue is provided.

In the context of tracking advertisement usage, processing begins at block 541' where advertisement exposure is recorded. From there processing proceeds to block 542' where the revenue from advertisement usage is recorded. The revenue generated for the computing environment operator is then calculated and provided at block 543'. In the instance that the computing environment operator is a third party, in addition to the calculation of the revenue for the computing environment operator, a calculation and payment of funds is made to the third party for supplying the product and/or service requested through the interactive advertisement. The advertiser cost is then recorded at block 544'. Such processing may be representative of the instance in which an advertiser cooperates with a computing environment operator to transact one or more advertisement rule circumventions (e.g. place an advertisement in already committed advertisement space).

Rule Circumvention for Integrated Advertisements in Computing Environments

The systems and methods described herein also contemplate an alternative implementation where the participating user is an advertiser. In this illustrative implementation, the advertiser of products and services in computing environments, such as, interactive TV, online movies, streaming media, or video clips, may circumvent already established advertising rules over their competitors, such as better placement of advertisements in the computing environment for their products and/or services. In doing so, the participating advertisers transacting advertisement rule circumvention can better target and reach a larger audience. These participating users (i.e. advertisers) are charged for the advertisement rule circumvention much like other computing environment rule circumventions according to the rule circumvention creation, integration, and transaction techniques described above.

CONCLUSION

In sum, the present invention provides system and methods to create, integrate, and transact the circumvention of rules in a computing environment. It is understood, however, that the invention is susceptible to various modifications and alternative constructions. There is no intention to limit the invention to the specific constructions described herein. On the contrary, the invention is intended to cover all modifications, alternative constructions, and equivalents falling within the scope and spirit of the invention.

It should also be noted that the present invention may be implemented in a variety of computer environments (including both non-wireless and wireless computer environments), partial computing environments, and real world environments. The various techniques described herein may be implemented in hardware or software, or a combination of both. Preferably, the techniques are implemented in computer programs executing on programmable computers that each include a processor, a storage medium readable by the processor (including volatile and non-volatile memory and/or storage elements), at least one input device, and at least one output device. Program code is applied to data entered using the input device to perform the functions described above and to generate output information. The output information is applied to one or more output devices. Each program is preferably implemented in a high level procedural or object oriented programming language to communicate with a computer system. However, the programs can be implemented in assembly or machine language, if desired. In any case, the language may be a compiled or interpreted language. Each such computer program is preferably stored on a storage medium or device (e.g., ROM or magnetic disk) that is readable by a general or special purpose programmable computer for configuring and operating the computer when the storage medium or device is read by the computer to perform the procedures described above. The system may also be considered to be implemented as a computer-readable storage medium, configured with a computer program, where the storage medium so configured causes a computer to operate in a specific and predefined manner.

Although an exemplary implementation of the invention has been described in detail above, those skilled in the art will readily appreciate that many additional modifications are possible in the exemplary embodiments without materially departing from the novel teachings and advantages of the invention. Accordingly, these and all such modifications are intended to be included within the scope of this invention. The invention may be better defined by the following exemplary claims.

What is claimed is:

1. A system, comprising:
   a processor;
   a memory communicatively coupled to the processor, the memory having stored therein computer-executable instructions, comprising:
      a core transaction server program configured to receive a request to circumvent at least one predefined rule of a computer game, to communicate user account information to the computer game, to transact at least one circumvention of the at least one predefined rule including to transmit the at least one circumvention of the at least one predefined rule to the computer game without a user's account information qualifying for the circumvention, and to update the user account information upon the transaction of the at least one circumvention of the at least one predefined rule, wherein the core transaction server program is configured to perform the receiving, communicating, transacting, and updating as the computer game is played and without interrupting the computer game;
      an adapter configured to communicate with the core transaction server program the at least one circumvention of the at least one predefined rule and to process the at least one circumvention of the at least one predefined rule for integration in the computer game across a plurality of computing environment platforms; and
      a payment processing module in communication with the core transaction server program to reconcile payment for at least one executed transaction representative of the at least one circumvention of the at least one predefined rule, wherein the instructions are received from at least one of the core transaction server program, the adapter, and the payment processing module;
   wherein the core transaction server program is further configured to:
      track buying habits of one or more users of the gaming environment with respect to the at least one circumvention; and
      determine respective popularity of the circumventions of the at least one circumvention based on the tracked buying habits.

2. The system of claim 1, further comprising a web server providing a user website, wherein the user website and the computer game operate independently of each other, and wherein the user website and the computer game communicate information representative of the at least one circumvention of the at least one predefined rule and the transaction of the at least one circumvention of the at least one predefined rule.

3. The system of claim 1,
   wherein the core transaction server program is further configured to associate an amount with the at least one circumvention of the at least one predefined rule, to track a number of instances where the at least one predefined rule is circumvented, and to generate a total charge amount based on the associated amount and the number of instances; and
   wherein the payment processing module is configured to reconcile the payment based on the charge amount.

4. The system of claim 1, wherein the core transaction server program is further configured to adjust respective prices of circumventions of the at least one circumvention based upon the respective popularity.

5. The system of claim 1, wherein the core transaction server program is further configured to add credits to the user account information in response to the user assisting in subscribing another user to the at least one circumvention of the at least one predefined rule.

6. The system of claim 1, where in the core transaction server program is further configured to:
  receive a user input associated with a user account associated with the user account information indicating whether the user account desires access to a capability of circumventing predefined rules of the computer game;
  store the user input with the user account;
  upon initiation of gaming action by the user account in the gaming environment, determine whether the user input indicates that the user account desires access to the capability of circumventing the predefined rules of the computer game; and
  in response to the user input indicating that the user account desires access to the capability of circumventing the predefined rules, enable the user account to display in the computer game a plurality of circumventions that respectively have displayed prices.

\* \* \* \* \*